US012579699B2

(12) United States Patent
Wu et al.

(10) Patent No.: US 12,579,699 B2
(45) Date of Patent: Mar. 17, 2026

(54) PROGRESSIVE IMAGE COMPRESSION AND SYNCING

(71) Applicant: ADOBE INC., San Jose, CA (US)

(72) Inventors: Junda Wu, Long Island City, NY (US); Haoliang Wang, Sunnyvale, CA (US); Tong Yu, Fremont, CA (US); Stefano Petrangeli, San Francisco, CA (US); Gang Wu, San Jose, CA (US); Viswanathan Swaminathan, Saratoga, CA (US); Sungchul Kim, San Jose, CA (US); Handong Zhao, Cupertino, CA (US)

(73) Assignee: ADOBE INC., San Jose, CA (US)

( * ) Notice: Subject to any disclaimer, the term of this patent is extended or adjusted under 35 U.S.C. 154(b) by 299 days.

(21) Appl. No.: 18/451,201

(22) Filed: Aug. 17, 2023

(65) Prior Publication Data

US 2025/0061609 A1     Feb. 20, 2025

(51) Int. Cl.
| | |
|---|---|
| *G06T 9/40* | (2006.01) |
| *G06V 10/70* | (2022.01) |
| *G06V 10/75* | (2022.01) |

(52) U.S. Cl.
CPC .............. *G06T 9/40* (2013.01); *G06V 10/751* (2022.01); *G06V 10/768* (2022.01)

(58) Field of Classification Search
CPC ....... G06T 9/40; G06V 10/751; G06V 10/768
See application file for complete search history.

(56) References Cited

U.S. PATENT DOCUMENTS

2021/0067782 A1* 3/2021 Sharma ................ H04N 19/132

OTHER PUBLICATIONS

Sneyers, Jon, and Pieter Wuille. "FLIF: Free lossless image format based on MANIAC compression." 2016 IEEE international conference on image processing (ICIP). IEEE, 2016.https://ieeexplore.ieee.org/abstract/document/7532320 (Year: 2016).*
Piros, Sandor, and Peter Korondi. "Entropy based adaptive image compression procedure." 2018 Advances in Science and Engineering Technology International Conferences (ASET). IEEE, 2018. https://ieeexplore.ieee.org/abstract/document/8392485 (Year: 2018).*
Johnston, Nick, et al. "Improved Lossy Image Compression with Priming and Spatially Adaptive Bit Rates for Recurrent Networks." arXiv preprint arXiv:1703.10114 (2017).https://arxiv.org/abs/1703.10114 (Year: 2017).*

(Continued)

*Primary Examiner* — Han Hoang
(74) *Attorney, Agent, or Firm* — F. CHAU & ASSOCIATES, LLC

(57)          ABSTRACT

One or more aspects of the method, apparatus, and non-transitory computer readable medium include obtaining image data and computing a prediction residue value for a pixel of the image data using a prediction function. An entropy value for the pixel can then be determined based on the prediction residue value using context modeling, and progressive compressed image data for the image data can be generated based on the entropy value. The compressed image data can be used to enable collaborative image editing and other image processing tasks.

20 Claims, 15 Drawing Sheets

(56)            References Cited

OTHER PUBLICATIONS

1Blau, et al., "Rethinking Lossy Compression: The Rate-Distortion-Perception Tradeoff", Proceedings of the 36th International Conference on Machine Learning, Long Beach, California, PMLR 97, 2019, 11 pages.

2Boutell, et al., "PNG (Portable Network Graphics) Specification Version 1.0", Network Working Group, Request for Comments: 2083, Mar. 1997, 102 pages.

3Cai, et al., "Lossless Image Compression With Tree Coding of Magnitude Levels", 2005 IEEE International Conference on Multimedia and Expo, Amsterdam, 2005, 4 pages.

4Duanmu, et al. "Modeling Generalized Rate-Distortion Functions", arXiv preprint arXiv:1906.05178v1 [eess.IV] Jun. 12, 2019, 17 pages.

5Dukkipati, et al., "Gelfand-Yaglom-Perez Theorem for Generalized Relative Entropies", arXiv preprint arXiv:math-ph/0601035v1 Jan. 18, 2006, 12 pages.

6Egiazarian, et al., "A New Full-Reference Quality Metrics Based on HVS", 2006, 5 pages.

7Hinkle, et al., "Interlaced scan patterns based on progressive hexagonal grids", arXiv preprint arXiv:2212.03356v1 [cond-mat.other] Dec. 6, 2022, 9 pages.

8Jeon, "A Generalized Typicality for Abstract Alphabets", arXiv preprint arXiv:1401.6728v4 [cs.IT] Dec. 12, 2014, 44 pages.

9Jeon, et al., "Context-Based Trit-Plane Coding for Progressive Image Compression", arXiv preprint arXiv:2303.05715v2 [eess.IV] Mar. 13, 2023, 20 pages.

10Johnston, et al., "Improved Lossy Image Compression with Priming and Spatially Adaptive Bit Rates for Recurrent Networks", arXiv preprint arXiv:1703.10114v1 [cs.CV] Mar. 29, 2017, 9 pages.

11Karpathy, et al., "Deep Fragment Embeddings for Bidirectional Image Sentence Mapping", arXiv preprint arXiv:1406.5679v1 [cs.CV] Jun. 22, 2014, 9 pages.

12Lee, et al. "DPICT: Deep Progressive Image Compression Using Trit-Planes", arXiv preprint arXiv:2112.06334v2 [eess.IV] May 6, 2022, 10 pages.

13Marpe, et al., "Adaptive Codes for H.26L", ITU—Telecommunications Standardization Sector, Video Coding Experts Group (VCEG), Jan. 4, 2001, 7 pages.

14Marpe, et al., "Context-Based Adaptive Binary Arithmetic Coding in the H.264/AVC Video Compression Standard", IEEE Transactions on Circuits and Systems for Video Technology, vol. 13, No. 7, Jul. 2003, 17 pages.

15Marpe, et al., "Video Compression Using Context-Based Adaptive Arithmetic Coding", Proceedings 2001 International Conference on Image Processing (Cat. No. 01CH37205), Thessaloniki, Greece, 2001, 4 pages.

16Niedermayer, et al., "FFV1 Video Coding Format Version 4", Internet-Draft: draft-ietf-cellar-ffv1-v4-20, Dec. 2, 2022, 49 pages.

17Ren, et al., "Faster R-CNN: Towards Real-Time Object Detection with Region Proposal Networks", arXiv preprint arXiv:1506.01497v3 [cs.CV] Jan. 6, 2016, 14 pages.

18Sneyers, et al., "FLIF: Free Lossless Image Format", ICIP 2016, Sep. 26, 2016, 41 pages.

19Sneyers, et al., "FLIF: Free Lossless Image Format Based on Maniac Compression", 2016 IEEE International Conference on Image Processing (ICIP), Phoenix, AZ, USA, 2016, 5 pages.

20Toderici, et al., "Full Resolution Image Compression with Recurrent Neural Networks", arXiv preprint arXiv:1608.05148v2 [cs.CV] Jul. 7, 2017, 9 pages.

21Toderici, et al., "Variable Rate Image Compression with Recurrent Neural Networks", arXiv preprint arXiv:1511.06085v5 [cs.CV] Mar. 1, 2016, 12 pages.

22Wang, et al., "Image Quality Assessment: From Error Visibility to Structural Similarity", IEEE Transactions on Image Processing, vol. 13, No. 4, Apr. 2004, 14 pages.

23Wiedemann, et al., "DeepCABAC: Context-adaptive binary arithmetic coding for deep neural network compression", arXiv preprint arXiv:1905.08318v1 [cs.LG] May 15, 2019, 4 pages.

24Witten, et al., "Arithmetic Coding for Data Compression," Communications of the ACM, vol. 30, No. 6, Jun. 1987, 21 pages.

* cited by examiner

| 1 | 8 | 6 | 8 | 4 | 8 | 6 | 8 | 2 | 8 | 6 | 8 | 4 | 8 | 6 | 8 |
|---|---|---|---|---|---|---|---|---|---|---|---|---|---|---|---|
|   |   |   |   |   |   |   |   |   |   |   |   |   |   |   |   |
| 7 | 8 | 7 | 8 | 7 | 8 | 7 | 8 | 7 | 8 | 7 | 8 | 7 | 8 | 7 | 8 |
|   |   |   |   |   |   |   |   |   |   |   |   |   |   |   |   |
| 5 | 8 | 6 | 8 | 5 | 8 | 6 | ? | 5 |   | 6 |   | 4 |   | 6 |   |
|   |   |   |   |   |   |   |   |   |   |   |   |   |   |   |   |
| 7 |   | 7 |   | 7 |   | 7 |   | 7 |   | 7 |   | 7 |   | 7 |   |
|   |   |   |   |   |   |   |   |   |   |   |   |   |   |   |   |
| 3 |   | 6 |   | 4 |   | 6 |   | 3 |   | 6 |   | 4 |   | 6 |   |
|   |   |   |   |   |   |   |   |   |   |   |   |   |   |   |   |
| 7 |   | 7 |   | 7 |   | 7 |   | 7 |   | 7 |   | 7 |   | 7 |   |
|   |   |   |   |   |   |   |   |   |   |   |   |   |   |   |   |
| 5 |   | 6 |   | 5 |   | 6 |   | 5 |   | 6 |   | 4 |   | 6 |   |

1010 — OBTAIN A IMAGE DATA

1020 — COMPUTE A PREDICTION RESIDUE VALUE FOR A PIXEL

1030 — COMPUTE AN ENTROPY VALUE FOR THE PIXEL BASED ON THE PREDICTION RESIDUE

1040 — GENERATE PROGRESSIVE COMPRESSED IMAGE DATA BASED ON THE ENTROPY VALUE

1050 — TRANSMIT THE PROGRESSIVE COMPRESSED IMAGE DATA

PROGRESSIVE IMAGE COMPRESSION AND SYNCING

BACKGROUND

The present disclosure relates to image compression and collaborative image editing. Image compression is a way of reducing the number of bits used to encode an image. Image compression can be used to quickly transmit data, including image data. Image compression can enable image editing tasks such as collaborative image editing. For example, an image can be loaded and displayed line by line, or the image can remain a blank until the entire image can be displayed. Alternatively, with progressive image encoding, an image can be loaded in successive passes until a clear picture is formed, so a user can see a complete but blurry initial image that becomes clearer as it loads.

SUMMARY

Embodiments of the present disclosure provide systems and methods for image compression. In some embodiments, the image compression enables collaborative image editing where changes made by a user can be instantly displayed to other users through syncing. Using progressive syncing, visually important information can be prioritized.

A method, apparatus, and non-transitory computer readable medium for generating descriptions at varying levels of detail are described. One or more aspects of the method, apparatus, and non-transitory computer readable medium include obtaining image data, computing a prediction residue value for a pixel of the image data using a prediction function, computing an entropy value for the pixel based on the prediction residue value using context modeling, and generating progressive compressed image data for the image data based on the entropy value.

In one or more embodiments, computing a prediction residue value includes estimating context data for neighboring pixels, computing a prediction value for the pixel based on the context value, and comparing the image value to the prediction data to obtain the prediction residue value. In one or more embodiments, computing the entropy value includes identifying a set of pixels associated with the pixel based on the context modeling, and applying an entropy function to the set of pixels to obtain the entropy value.

A method is described including obtaining image data for an image at a first device, computing an entropy value for a pixel based on a prediction residue value of a prediction function, generating progressive compressed image data for the image data based on the entropy value, transmitting the progressive compressed image data to a second, and displaying the image at the second device in real time based on the progressive compressed image data.

An apparatus is described. One or more aspects of the apparatus includes one or more processors, a memory coupled to and in communication with the one or more processors, wherein the memory includes instructions executable by the one or more processors to perform operations including obtaining image data, computing a prediction residue value for a pixel of the image data using a prediction function, computing an entropy value for the pixel based on the prediction residue value using context modeling, and generating progressive compressed image data for the image data based on the entropy value.

BRIEF DESCRIPTION OF THE DRAWINGS

FIG. 7 shows a diagram of previously determined values for pixels in an example interlacing scheme, according to aspects of the present disclosure.

DETAILED DESCRIPTION

Figure 1:
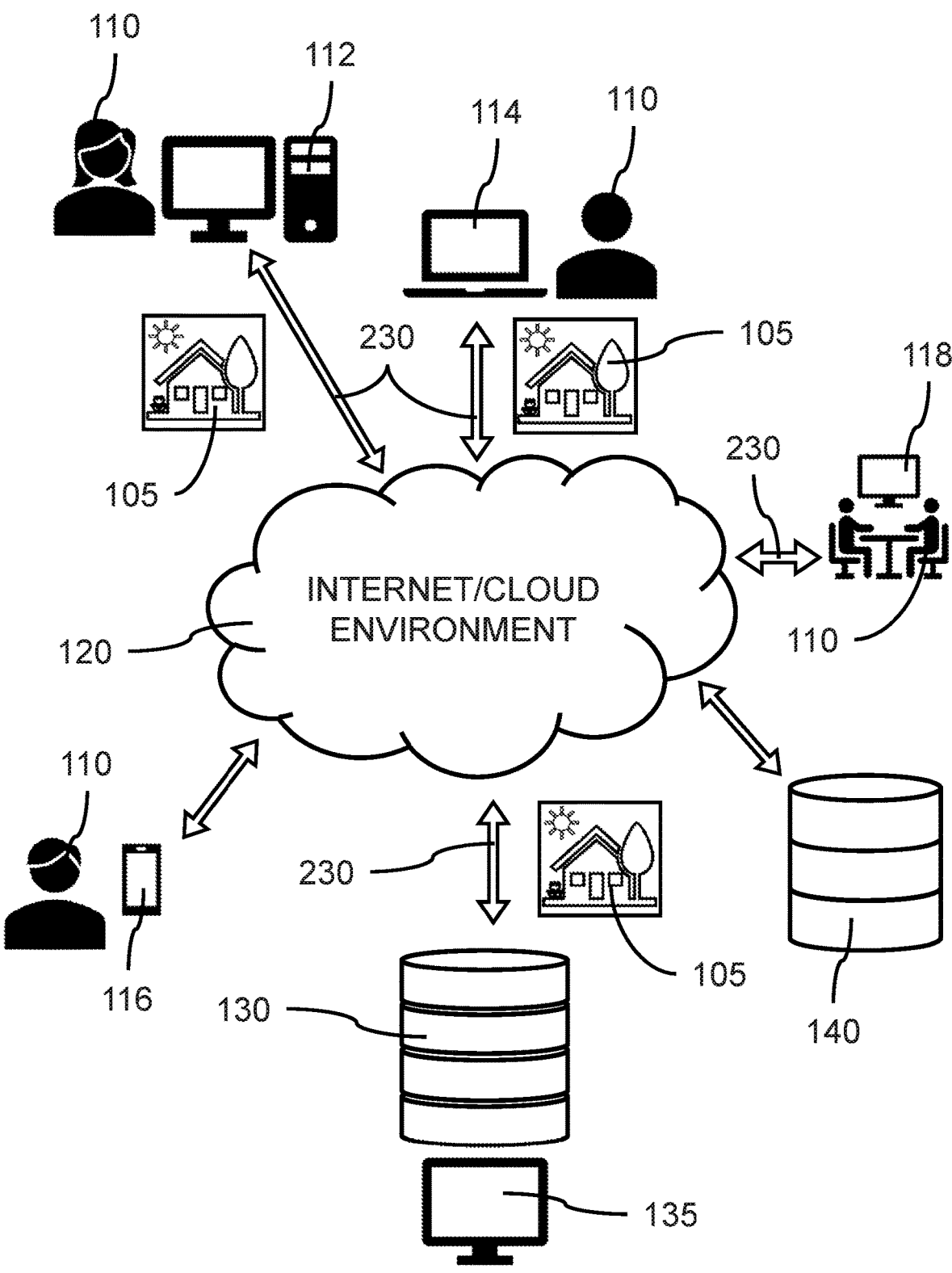
FIG. 1 is an illustrative depiction of a high-level diagram of users interacting with a synchronized image editing system, according to aspects of the present disclosure.

The present disclosure relates to image compression. Embodiments of the disclosure include progressive compression and synchronization (syncing) of images and image editing data. Some embodiments utilize an entropy-based pixel prioritization strategy. Progressive image compression and syncing is an important and challenging problem, particularly when the users are collaboratively editing the same image, the latency of updates can increase and pixelation of the images can be disturbing.

Online collaboration can be important for content creators. When two or more users are collaboratively editing the same image, they would like the changes made by each user to be instantly displayed to other users as well. However, such image syncing can utilize very frequent data transmission, as each user works independently to edit an image. Furthermore, editing large images can significantly increase the amount of data to be stored and transmitted compared to a text document. Collaboratively editing photos, videos, and other multimedia files can introduce unique challenges, as the data to be synchronized between users can increase significantly. Therefore, live image co-editing may not be easily achieved. Extensive image editing can cause the accumulation of errors when utilizing lossy compression methods. Therefore, a lossless compression approach can be used for transmitting edited image data without compounding errors through repeated compression-decompression operations with the image data communicated between users working on the same image.

In various embodiments, instead of sending the full-size image at each time step, a preview of an original image can be updated with any changes occurring, at the lowest cost of network bandwidth and computing resources. By prioritizing relevant image data, users can get a better understanding of the complete image during intermediate stages of transmission.

For example, after sending the preview image, the quality of this image can be gradually improved, while the detailed information is streaming, until the full-size image is loaded. The present disclosure can enable content-aware data compression. Content aware compression can synchronize visually important regions of the image with a higher priority than relatively unimportant regions, where the determination of the visually important regions can be based on an entropy value. Therefore, when one user makes a change to a shared image, the changes may be synced and communicated to other users as soon as possible. By displaying the changes partially to the user, as the data is still transmitting, the "perceived" latency may be reduced.

Context modeling is a process of constructing a model conditioned on neighboring values or symbols, which can be the first step in the entropy coding scheme. In context modeling, a symbol related to an arbitrary syntax element is given, then in a first step, a suitable model is chosen according to a set of past observations, which serves as a statistical model of the source, and which is used to encode the actual symbol. Near-zero symbol coding can be used for the pixel values, where quantized pixel differences can be used as context information. Each binary decision can be encoded with a binary arithmetic coding engine using a probability model which has been supplied by the context modeling stage.

Estimation of the current probability of a symbol can be based on the symbols that precede it, which is referred to as the context. During encoding the current context model can be updated with the previously encoded symbol, such that the context model can keep track of the actual statistics and provide an adaptation. The contexts would not be static (e.g., one big, fixed array) but dynamic, being a tree, which grows branches during encode/decode processes. The tree structure is learned at encode time, where the context model is associated with the encoded image and not a fixed format (Meta-Adaptive Near-zero Integer Arithmetic Coding (MA-NIAC)). Adaptive coding refers to variants of entropy encoding methods of lossless data compression, that adapt to localized changes in the characteristics of the data, and do not require a first pass over the data to calculate a probability model.

Some examples of the method, apparatus, non-transitory computer readable medium, and system further include obtaining image data, computing a prediction residue value for a pixel of the image data using a prediction function, computing an entropy value for the pixel based on the prediction residue value using context modeling, and generating progressive compressed image data for the image data based on the entropy value.

According to embodiments of the disclosure, the term entropy value refers to a level of information inherent in the possible values of a variable (e.g., the expected value of self-information of the variable). For example, a prediction function can be used to predict pixel values of an image, and residuals can be calculated based on the difference between the predicted values and the actual pixel values of an image. An entropy value can be used to measure the information inherent in the prediction residuals. An entropy value can be measured in units of bits, shannons, nats, dits, bans, hartleys or other units that measure information.

By combining an adaptive binary arithmetic coding technique with context modeling, a high degree of adaptation and redundancy reduction is achieved. One or more aspects of the apparatus and method include one or more processors; a memory coupled to and in communication with the one or more processors, wherein the memory includes instructions executable by the one or more processors to perform operations including obtaining image data, computing a prediction residue value for a pixel of the image data using a prediction function, computing an entropy value for the pixel based on the prediction residue value using context modeling, and generating progressive compressed image data for the image data based on the entropy value.

The progressive compressed image data may include a compressed version of the image data that is divided into multiple portions based on the entropy values for different regions of the image. The progressive compressed image data can be sent sequentially, for example, with portions of the image that have higher entropy values being transmitted first. This can result in a better reconstruction of the image during the transmission (i.e., when only a portion of the compressed image data has been transmitted and received). On the receiving end, a predictive function can be used to estimate the appearance of the image, and when additional portions of the compressed image data are received the image display can be progressively improved. Because high entropy portions of the compressed image data are sent first, the intermediate display of the image can more faithfully represent the image. For example, in situations where an edit has been made to the image, the high entropy portions of the compressed image data may be more likely to include data that reflects changes made to the image (or the impact of those changes on the overall appearance of the edited image).

Accordingly, embodiments of the disclosure improve synchronized image editing, which provides increased perceptual improvement to edited images through using an entropy value for identifying pixels to be encoded and transmitted. The rate of improvement to the initially transmitted preview image 903 can be greater using the entropy prioritized pixel compression and transmission than a sequentially scanned image or an image compressed and transmitted using a fixed interlace sequence (e.g., pixel order).

Collaborative Image Editing

FIG. 1 is an illustrative depiction of a high-level diagram of users interacting with a synchronized image editing system, according to aspects of the present disclosure.

According to FIG. 1, image data for an image 105 may be obtained, produced, or edited at a first device, and an entropy value for a pixel of the image may be computed based on a prediction residue value of a prediction function. Then progressive compressed image data may be generated for the image data based on the entropy value, and the progressive compressed image data may be transmitted to a second device. The second device may display the image 105 at the second device in real time based on the progressive compressed image data.

In some embodiments, the process includes receiving an image edit input at the first device, wherein the progressive compressed image data is transmitted in response to the image edit input. In some embodiments, the image is displayed in real time at a plurality of successively increasing detail levels at the second device based on the progressive compressed image data. In some embodiments, the progressive compressed image data is transmitted to the second device in a data stream including a first portion of the progressive compressed image data that has a higher entropy that a second portion of the progressive compressed image data, and wherein the first portion is transmitted prior to the second portion. In some embodiments, the process enables synchronizing the image at the first device and the second device based on the progressive compressed image data.

In various embodiments, an image 105 may be, for example, a color photograph, a color photo-realistic graphic, a gray-scale photo, a drawing or comic with a fixed color palette, a black-and-white drawing or diagram, line art, a painting, game graphics, and combinations thereof. An image 105 can be represented by image data including one or more values, x, corresponding to a 2-dimensional (2D) spatial location $(n_1, n_2)$, for $N_1$(rows)×$N_2$(columns) positions (pixels). The values, x, associated with the locations, $x(n_1, n_2)$, can be a single luminance value in a gray-scale space (e.g., 0 to 256), or a set of values in a color space, for example, Standard Red-Green-Blue (sRGB), Gamma-corrected-Red-Green-Blue (TRGB), Red-Green-Blue-Alpha (RGBA), Cyan-Magenta-Yellow (CMY), Luminance-Chrominance (e.g., YUV, YCbCr, YCoCg), etc.

The image data can be the set of values for the $N_1$×$N_2$ positions, where $N_1$ is the number of rows forming the image, $0 \leq n_1 \leq N_1$ and $N_2$ is the number of columns forming the image, $0 \leq n_2 \leq N_2$. Each pixel can be a sample of an original natural image (e.g., photograph) or synthetic image (e.g., drawings). The size of an image data file can then be $N_1$×$N_2$×B, where B is the number of bits representing the gray/color values, for example, 8-bit RGB=8 red+8 blue+8 green=24 bits (B). A 256 pixel×256 pixel RGB image file can include 1,572,864 bits of image data. The image data file may also include a file name, main header, second header, metadata, etc., that can further increase the image file size. A header may also describe a chain of transformations that were applied before encoding, which could be reversed after decoding. A compressed image can be smaller than the $N_1$×$N_2$×B bits, although in some instances a compression algorithm may create a larger image file.

In one or more embodiments, a user 110 can interact with a synchronized image editing system 130 through cloud/internet communication 120. A user 110 may interact with the synchronized image editing system 130 using user device(s), for example, a desktop computer 112, a laptop computer 114, a handheld mobile device 116, for example, a smartphone or tablet, or a smart tv 118. In various embodiments, the synchronized image editing system 130 can be, for example, on a remote server, which may be configured to store one or more image data files, where the synchronized image editing system 130 can include a display terminal 135.

In various embodiments, a user 110 can communicate with the synchronized image editing system 130, where the user can communicate with the synchronized image editing system 130 through the user device and a communication channel 230 that can include an internet/cloud environment 120. The internet/cloud environment 120 can include computer networks with communication facilities using standardized communication protocols, where the computer networks can provide processing and data storage resources to the user 110 through the communication facilities.

In various embodiments, all or a portion of a synchronized image editing system 130 can be located on and/or performed by the user device 112, 114, 116, 118, where the functions of the synchronized image editing system 130 can be located on and/or performed by the user device 112, 114, 116, 118. The user device 110 may include a personal computer, laptop computer, mainframe computer, palmtop computer, personal assistant, smart phone, tablet, mobile device, or any other suitable processing apparatus. In some non-limiting examples, the user device includes software that incorporates a synchronized image editing system 130.

In various embodiments, the user devices 112, 114, 116, 118, 119, can include software that can communicate and interact with the synchronized image editing system 130, including, but not limited to, submitting an image 105 for editing.

In various embodiments, the user can identify an image 105 for editing, where the image may be stored on the user devise, the synchronized image editing system 130, or storage resources in the internet/cloud environment 120, for example, a database 140. The user can perform an edit on the image 105, and compressed image data can be generated for the edited image based on entropy values (e.g., based on entropy values for residuals of a pixel prediction function). Then, the system may synchronize an image display of the image 105 in a remote image editing application based on the compressed image data.

In various embodiments, the user 110 or synchronized image editing system 130 can communicate with a database 140 via the internet/cloud environment 120 over a communication channel 230, where the database 140 can store a plurality of images. Images and other resources for obtaining or editing the image 105 can be stored on the database 140.

In various embodiments, the internet/cloud environment 120 is a computer network configured to provide on-demand availability of computer system resources, such as data storage and computing power. Embodiments of the disclosure can be implemented in a server operating from the internet/cloud environment 120. The term cloud is sometimes used to describe data centers available to many users over the Internet. In some examples, the internet/cloud environment 120 provides resources without active management by the user 110. The internet/cloud environment 120 can include data centers available to multiple users over the Internet, where the internet can be a global computer network providing a variety of information and communication facilities.

Some large cloud networks have functions distributed over multiple locations from central servers. A server is designated an edge server if it has a direct or close connection to a user 110. In some cases, internet/cloud environment 120 may be limited to a single organization. In other examples, internet/cloud environment 120 is available to many organizations, where communication may be through the internet. In an example, internet/cloud environment 120 includes a multi-layer communications network comprising multiple edge routers and core routers. In another example, internet/cloud environment 120 is based on a local collection of switches in a single physical location. According to some aspects, the internet/cloud environment 120 provides communications between user device(s) 112, 114, 116, 118, and a synchronized image editing system 130.

Image Compression

Figure 2:
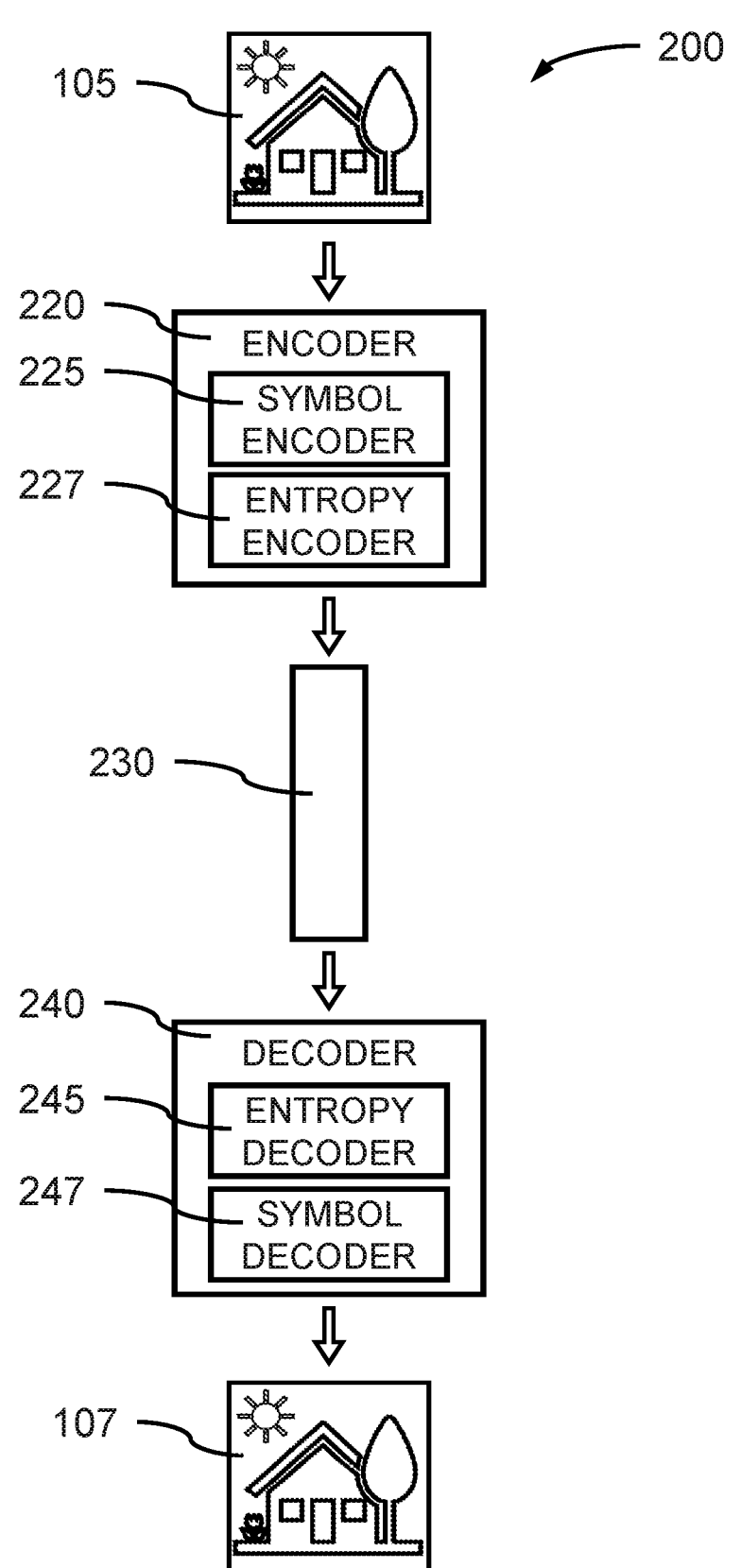
FIG. 2 a block diagram of an example of an image compression-decompression system, according to aspects of the present disclosure.

FIG. 2 a block diagram of an example of an image compression-decompression system, according to aspects of the present disclosure.

An image compression-decompression system 200 can perform compression techniques to reduce the size of an image 105 and/or edits (changes) to the image 105, so that synchronization latency between a first user and a second user can be reduced by reducing the amount of information transmitted. However, as the image compression progresses, the pixels to be encoded next may be chosen without considering its importance to human perception of the whole image.

In various embodiments, pixels to be encoded are chosen based on a prioritization scheme utilizing an entropy calculation. The entropy of each pixel can be calculated, and pixels with higher entropy can be prioritized. Progressive compressed image data can be generated for the image data based on calculated entropy values.

In various embodiments, an image 105 can be provided to an encoder 220 that is configured to compress the image data to a smaller size than the data encoding the non-compressed initial image 105. The encoder 220 can include one or more compression algorithms that transform the initial image data into a reduced-size data set.

In various embodiments, the encoder includes a symbol encoder 225, that can be configured to transform the image data into symbols, and an entropy encoder 227, that can be configured to convert the symbols to an arithmetic coding.

In various embodiments, the compression algorithm is a mapping, M, to an encoding, and the decompression algorithm is an inverse mapping, $M^{-1}$, back to an image. For lossless compression, the inverse mapping regenerates the data of the non-compressed initial image 105 in comparison to lossy compression, which generates an approximation of the data of the non-compressed initial image 105. For lossy compression, M is not invertible, so $M^{-1}$ does not regenerate the same initial image data.

In various embodiments, the size of the image 105 can be reduced by down-sampling, and the new reduced size image is encoded using one of the sequential, progressive, or loss-less modes.

In various embodiments, the encoded data generated by the encoder 220 can be communicated over a communication channel 230, where the communication channel 230 can be for example, a wired communication channel or a wireless communication channel. The communication channel 230 may introduce noise to the encoded communication.

In various embodiments, the transmitted down-sampled image can be up-sampled to a new image, that is used as a prediction of the original image 105 at the up-sampled resolution. The pixel traversal processes (e.g., interlacing mode/scheme) can be vertical or horizontal. In the case of a vertical traversal, each pixel is dependent on the previous vertical pixels, while the pixels in the right and left columns are from the previous zoom levels, which are assumed to be transmitted beforehand. For the process of horizontal traversal, each pixel is dependent on the previous horizontal pixels, while the pixels in the top and bottom rows are from the previous zoom levels, where Zoom levels relate to the pixels previously encoded-decoded based on the utilized interlacing mode/scheme. To enable flexible pixel selection orders, the prediction of each transmitted pixel should not depend on pixels in the same or the lower zoom level to make sure the transmitted pixels can be successfully decoded.

In various embodiments, for interlacing, Zoom level 0 is the full image; Zoom level 1 is all the even-numbered rows of the image (counting from 0); Zoom level 2 is all the even-numbered columns of Zoom level 1. In general: Zoom level 2k+1 are all the even-numbered rows of Zoom level 2k, and Zoom level 2k+2 are all the even-numbered columns of Zoom level 2k+1, where each even-numbered Zoom level 2k is a down-sampled version of the image, at scale $1:2^k$. A maximum Zoom level of an image is the Zoom level with a single pixel, where the pixel is in the top-left corner of the image (row 0, column 0). The Zoom levels are encoded from highest (most zoomed out) to lowest. Zoom level k of a color channel can only be encoded after Zoom level k+1 of that color channel has already been encoded.

In various embodiments, the compressed image data can be received, as the arithmetic encoding, at a decoder 240, where the decoder 240 can be configured to decompress the image data to a larger size than the encoded data for the non-compressed initial image 105. The image compression-decompression system 200 can perform decompression techniques to reconstruct an image. The decoder 240 can include one or more decompression algorithms that transform the compressed image data into a full-size data set. The decoder 240 can generate a decompressed image 107, where the decompressed image 107 can be a lossless reconstruction of the original image 105, although the decompressed image 107 may not be an exact duplicate of the original image 105 (e.g., due to noise).

In various embodiments, the decoder 240 can include an entropy decoder 245 configured to transform the arithmetic coding into symbols, and a symbol decoder 247 configured to convert the symbols into the decompressed image 107.

In various embodiments, a pixel smoothing method can involve using an average or median value of a group of pixels to produce a less pixelated image.

Figure 3:
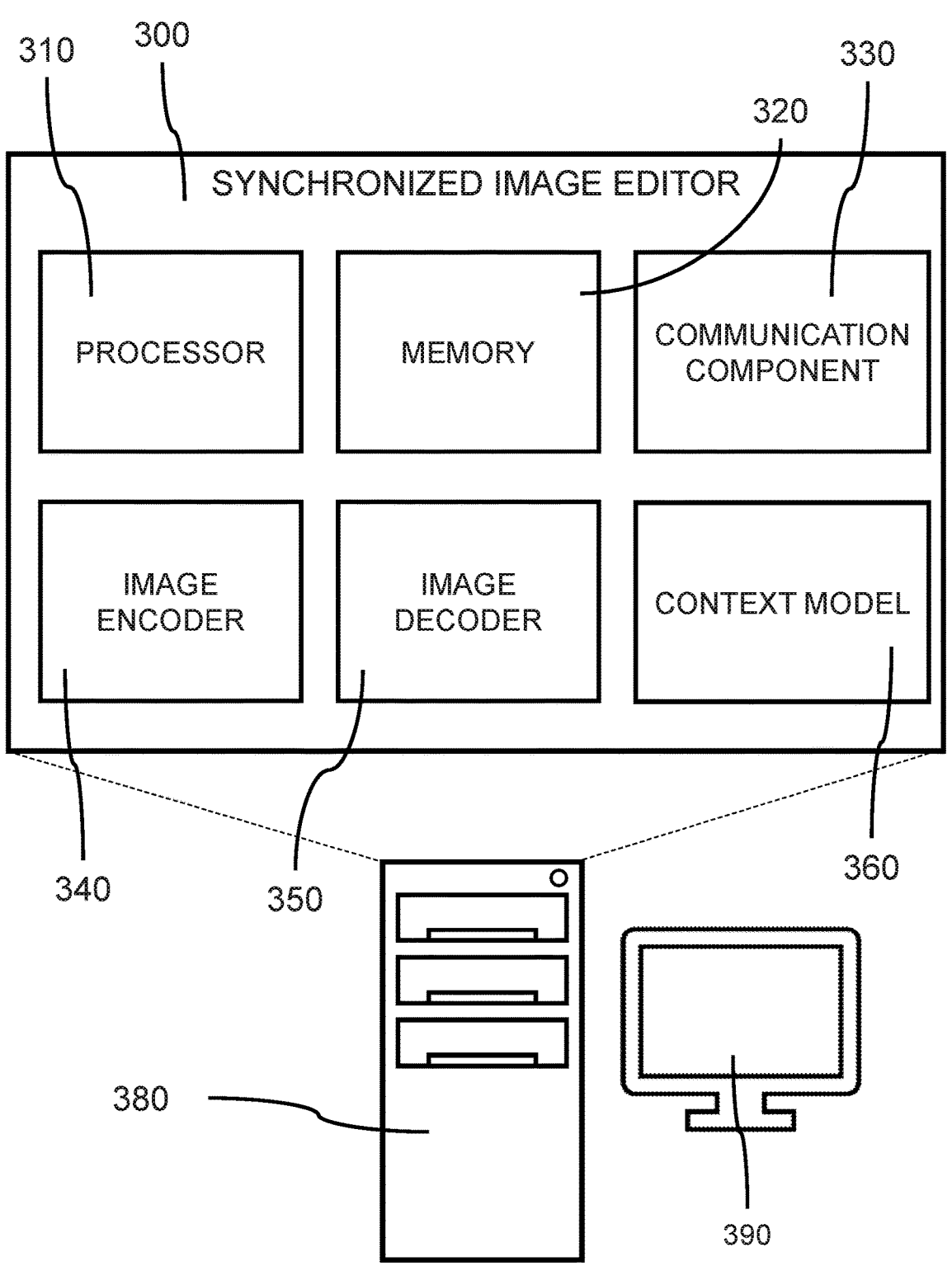
FIG. 3 shows a block diagram of a synchronized image editor system, according to aspects of the present disclosure.

FIG. 3 shows a block diagram of a synchronized image editor system, according to aspects of the present disclosure.

In various embodiments, the synchronized image editor system 300 can include a computer system 380 including one or more processors 310, computer memory 320, a communication component 330, an image encoder 340, an image decoder 350, and a context model 360. The computer system 380 of the video segment identifier 300 can be operatively coupled to a display device 390 (e.g., computer screen) for presenting prompts and images to a user 110, and operatively coupled to input devices to receive input from the user, including the original image(s).

According to some aspects, processor unit 310 includes one or more processors. Processor unit 310 can be an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 310 is configured to operate a memory array using a memory controller. In other cases, a memory controller is integrated into the processor. In some cases, processor unit 310 is configured to execute computer-readable instructions stored in a memory to perform various functions. In some embodiments, processor unit 310 includes special-purpose components for modem processing, baseband processing, digital signal processing, or transmission processing. Processor unit 310 is an example of, or includes aspects of, the processor described with reference to FIG. 12.

According to some aspects, memory unit 320 comprise a memory coupled to and in communication with the one or more processors, where the memory includes instructions executable by the one or more processors to perform operations. Examples of memory unit 320 include random access memory (RAM), read-only memory (ROM), or a hard disk. Examples of memory unit 320 include solid-state memory and a hard disk drive. In some examples, memory unit 320 is used to store computer-readable, computer-executable software including instructions that, when executed, cause a processor to perform various functions described herein. In some cases, memory unit 320 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 320 store information in the form of a logical state. Memory unit 320 is an example of, or includes aspects of, the memory subsystem described with reference to FIG. 12.

In various embodiments, a communication component 330 can provide an interface to transmit and receive encoded data over a communication channel 230, where the communication component 330 can be configured as an interface between an image encoder 340 and/or image decoder 350 and the communication channel 230.

In various embodiments, an image encoder 340 can be configured to perform a color transformation on the image data of an image 105, calculate a predicted residue value for one or more pixels forming the image 105, and encode the image data to generate compressed image data for transmission.

In various embodiments, an image decoder 350 can be configured to receive compressed image data, decode the compressed image data, calculate a predicted residue value, and perform a color transformation on the image data to construct a decompressed image 107.

In various embodiments, a context model 360 can be configured to generate a Meta-Adaptive Near-zero Integer Arithmetic Coding (MANIAC) Tree for the image data, compute an entropy value for the pixels, and provide a subset of the image data in the MANIAC tree for encoding and transmission. The subset of the image data in the MANIAC tree selected for encoding and transmission can be selected based on the entropy values for the pixels.

Figure 4:
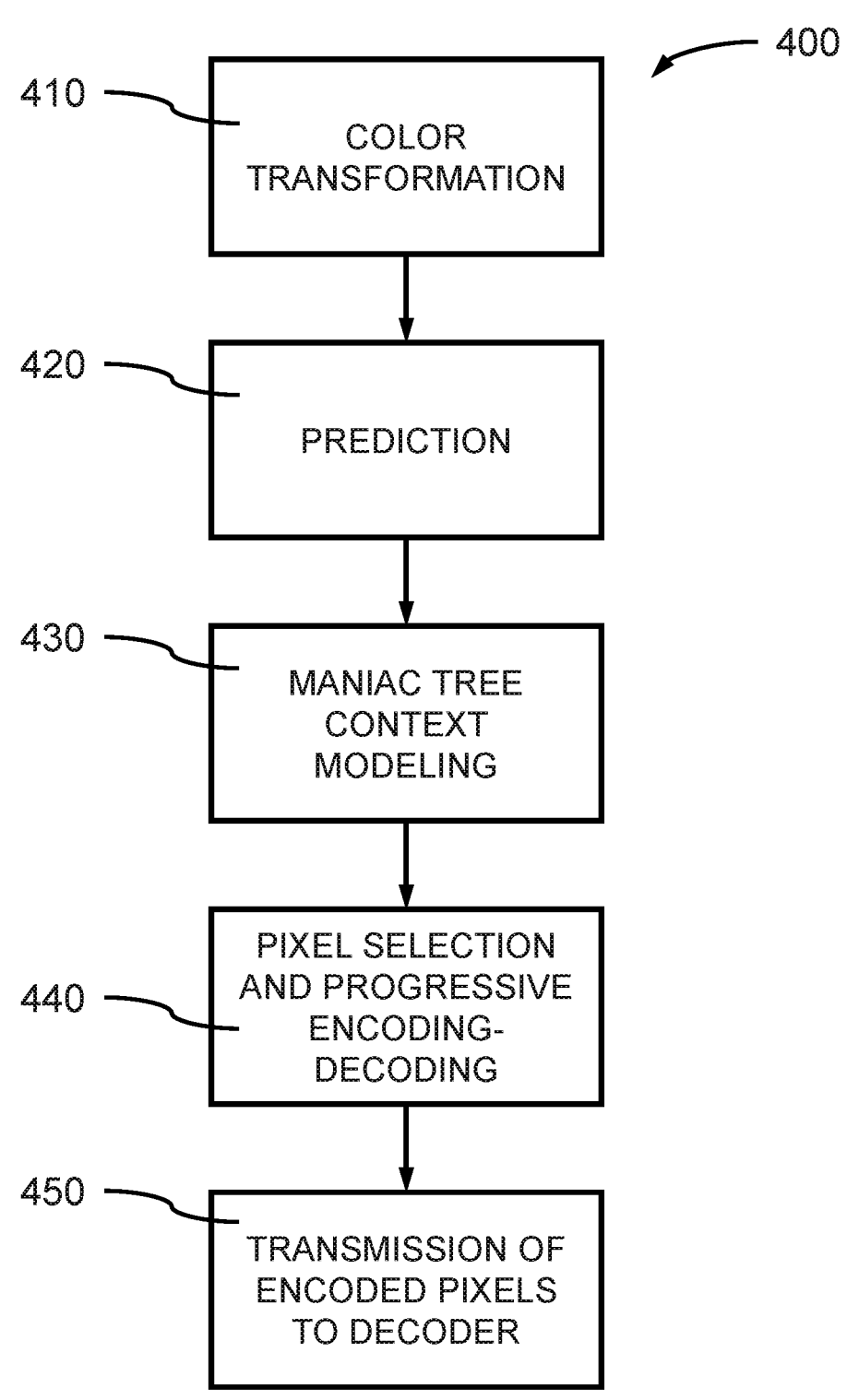
FIG. 4 shows a flow diagram of a compression algorithm pipeline for synchronized image editing, according to aspects of the present disclosure.

FIG. 4 shows a flow diagram of a compression algorithm pipeline for synchronized image editing, according to aspects of the present disclosure.

In various embodiments, a compression algorithm pipeline 400 for synchronized image editing can include a color transformation operation 410, a prediction calculation operation 420, a MANIAC Tree generation operation 430, and pixel selection and encoding operation 440, where the compression algorithm pipeline 400 can provide lossless image compression. The encoded pixels can be transmitted 450 over a communication channel to a decoder for image reconstruction. Each of the operations 410, 420, 430, and 440 may be executed by suitable processors 310 (e.g., cpu, gpu, dsp, etc.).

In various embodiments, the image pixels can be fed into the compression algorithm pipeline 400 in a predetermined order based on an interlaced image scan sequence (e.g., Adam7 or Adam∞ scan sequence). In some cases, a codec is used for image compression. A codec is a device or computer program that encodes or decodes a data stream or signal.

At operation 410, a color transformation can be performed on the original image 105, where the values for the gray scale or color channels of the image 105 can be transformed to reduce the effective bit depth of the image data, for example, an RGBA color space image can be transformed to YCoCgA. A color transformation can modify the pixel data in a reversible way to make the image data compress to a smaller size than the original color space data, and to keep track of the range of actually occurring pixel color values. The pixel values can be in a range of $0-2^{bit\ depth}$.

Accordingly, a color transformation can be used during the compression. For example, the YCoCg color model, also known as the YCgCo color model, is the color space formed from a simple transformation of an associated RGB color space into a luma value (denoted as Y) and two chroma values called chrominance green (Cg) and chrominance orange (Co). It is supported in video and image compression designs.

For example, color channel 0 can represent Red in RBGA with a value in a range of 0 to 255, color channel 1 can represent Green with a value in a range of 0 to 255, color channel 2 can represent Blue with a value in a range of 0 to 255, and color channel 4 can represent an Alpha value in a range of 0 to 255. The color transform can transform these color values to YCoCgA values. The YCoCg transformation tends to decorrelate the channels, which can help to improve compression.

The three values of the YCoCg color model are calculated as follows from the three color values of the RGB color model:

$$\begin{bmatrix} Y \\ Co \\ Cg \end{bmatrix} = \begin{bmatrix} \dfrac{1}{4} & \dfrac{1}{2} & \dfrac{1}{4} \\ \dfrac{1}{2} & 0 & \dfrac{-1}{2} \\ \dfrac{-1}{4} & \dfrac{1}{2} & \dfrac{-1}{4} \end{bmatrix} \cdot \begin{bmatrix} R \\ G \\ B \end{bmatrix}.$$

The values of Y are in the range from 0 to 1, while Co and Cg are in the range of −0.5 to 0.5. For example, pure red is expressed in the RGB system as (1, 0, 0) and in the YCoCg system as (¼, ½, −¼). An inverse matrix converts from the YCoCg color model back to the RGB color model, as may be used in an image decoder 350. An image 105 may only use a small fragment of the full color space, where the image may utilize a predetermined color palette. The values that actually occur in each color channel can be recorded and stored in a memory. The smaller the range of values, the fewer the number of bits that may be used to encode the particular value in the range.

In various embodiments, a color transformation 410 can examine each color channel independently, and reduce that color channel's range by eliminating values that do not actually occur in the image. To be able to reconstruct the original color values, the mapping from the reduced color value range to the original color range can be encoded.

At operation 420, a prediction can be made for upcoming pixel values, where the value is calculated by a predictor resulting in a predicted value. The difference between the actual pixel value and the predicted value can tend to be close to zero; thereby, reducing the bits used for encoding. The local context of the pixel can be computed as a MANIAC property vector. The MANIAC property vector, which is used to determine the context, is constructed by calculating the property values for each pixel/residual, and concatenating the calculated property values together.

In various embodiments, the differences between predicted pixel values and actual values are encoded, as residuals.

At operation 430, a Meta-Adaptive Near-zero Integer Arithmetic Coding (MANIAC) tree 800 can be constructed for the pixels of the image. The MANIAC tree 800 (see FIG. 8) can learn and grow branches and leaves during encoding and decoding. The entropy encoding method "meta-adaptive near-zero integer arithmetic coding" (MANIA) can be used to categorize image data (pixels) based on a calculated entropy value. There can be one tree per non-trivial color channel.

In various embodiments, the entropy can be calculated for each of the leaf nodes, and the leaf nodes can be sorted based on a maximum entropy.

In various embodiments, an Entropy-based Pixel Prioritization Strategy can be utilized, where entropy values can be calculated for the leaf nodes of a tree. The entropy values can be calculated as:

$$H = \sum_j P_j \cdot \log P_j;$$

where $P_j$ is the probability (probability mass function) of value $x_j$.

In various embodiments, the leaf nodes can be sorted in a descending order based on the calculated entropy values, where leaf nodes associated with pixels having a higher entropy can be prioritized for encoding and transmission over pixels having a lower relative entropy value.

In various embodiments, the local context (adjacent pixels used for prediction) is described as a vector of integer numbers, which are called properties. The properties are the characteristics (e.g., color values) of a pixel, and the contexts are the actual values of the properties, where each pixel can have a number of properties (e.g., 5, 11).

In various embodiments, the leaf nodes of a MANIAC tree can contain a counter and a chance table. To determine which chance table to use, a decision tree, which is referred to as a MANIAC Tree, is used. The chance table is used in the Near-zero symbol coding. The counter gets decremented each time a property value of a pixel reaches the leaf node. When the counter reaches zero, the tree 'grows' and the leaf node becomes an inner node (a decision node). The MANIAC Tree can maintain the special arrangement and structure of the image as a 2-dimensional (2D) arrangement.

In various embodiments, to construct a MANIAC Tree, the inner nodes of a MANIAC tree contain a test of the form: property[k]>value; where if this test evaluates to true, then the left branch is taken, otherwise the right branch is taken. Eventually a leaf node is reached. The leaf nodes of a MANIAC tree contain a counter and a chance table. This chance table is used in the Near-zero symbol coding. The counter gets decremented each time the leaf node is reached. When it reaches zero, the tree 'grows' and the leaf node becomes an inner node (a decision node), where the tree is 'grown' as more and more symbols are encoded. The parent node's chance table gets duplicated and becomes the chance table of the two branch nodes. The number of contexts, that can be the number of leaf nodes in the MANIAC tree, can be image-dependent. The number of contexts is not static, but also grows during encoding, where there can be as many contexts as needed to represent the influence of local properties on the probability distributions.

In various embodiments, the MANIAC tree is not encoded immediately, where encoding can occur subsequent to generating one or more MANIAC Tree(s). Instead, a tree can be initialized with a single root node per color channel, and a 'rough preview' of the image using a few of the highest zoom levels can be encoded.

In various embodiments, an entropy value is calculated for a group of pixels associated with a leaf node, where the calculated entropy value represents importance of the pixels associated with the leaf node. The entropy value can determine the priority of the leaf node for encoding and transmitting the pixels. Pixels having a higher entropy value can be considered to be more important to the displayed image than pixels having a lower entropy value. A leaf node can have a one-to-many relationship with the pixels, such that a plurality of pixels are associated with one leaf node.

In various embodiments, the full structure of the tree is known in advance by the decoder.

At operation 440, pixels can be selected for compression and transmission based on the entropy values, where pixels with greater entropy values can be encoded and communicated first. The selected pixels can be encoded using an arithmetic coding method.

At operation 450, the encoded pixels can be transmitted 450 over a communication channel 230 to a decoder 240 for image reconstruction.

Figure 5:
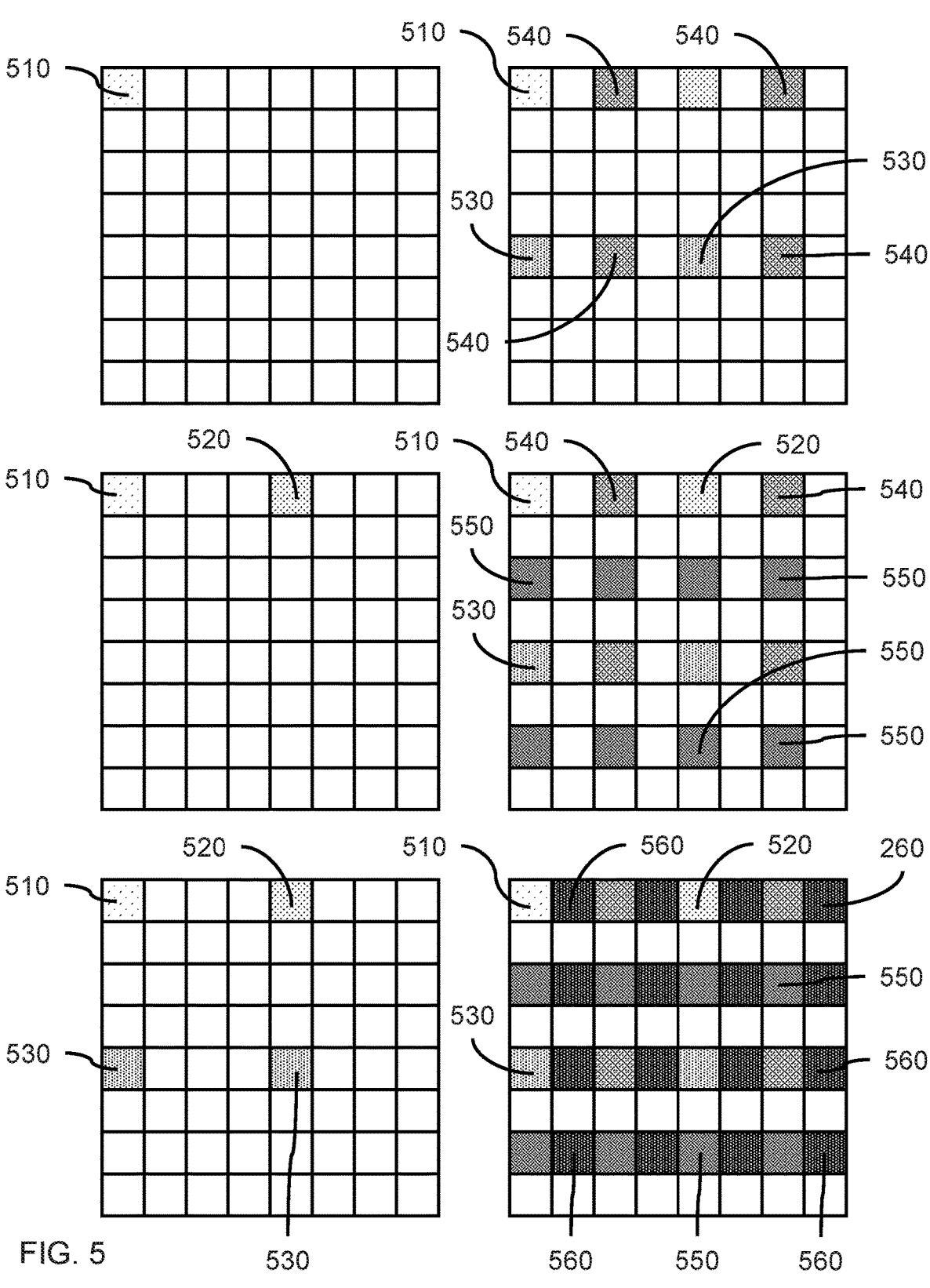
FIG. 5 shows a scan sequence illustrating an example interlacing scheme for encoding and decoding an image, according to aspects of the present disclosure.

FIG. 5 shows a scan sequence illustrating an example interlacing scheme for encoding and decoding an image, according to aspects of the present disclosure.

The contexts depend on the image traversal order (e.g., interlaced or non-interlaced). Interlacing is a form of incremental encoding/decoding, where non-adjacent pixels of an image can be displayed incrementally. During progressive scanning of an image frame, the difference between a current pixel and its predicted value, judging by neighboring pixels, is sent to the entropy-coding process, where a predictor provides a prediction calculation formula for a sample value at position, x, that can be computed based upon the relative neighboring values. The prediction calculation can be done as:

$$\text{Prediction} = \text{Median (Top, Left, Top + Left} - \textit{TopLeft});$$

where the third value, "Top+Left−TopLeft", is effectively equivalent to applying the top predictor to the current and the left sample, followed by applying the left predictor to the prediction residual of the top predictor. This can exploit both horizontal and vertical redundancy.

Scanline traversal (i.e., non-interlaced) scans the image line by line from top to bottom, where each line is scanned from left to right in sequence (adjacent pixels). When outputting a pixel value, the value of the pixels above and to the left were previously scanned and the values are known. Those values can be used to compute a prediction value that is also available at decode time. The prediction error can be coded using an image coding method, where the prediction error has a smaller value than the original pixel values and can be coded with fewer bits. A block can be 8×8 pixels. A macroblock can be 16×16 pixels.

In various embodiments, the interlaced scan sequence can be, for example, an Adam7 scan sequence. Adam7 interlacing can be used to progressively reconstruct a compressed image based on 8×8 pixel blocks. In each Adam7 interlacing step, the number of pixels doubles. The first step is simply one pixel: the pixel in the top-left corner of a block. Then, in each interlacing step, either the number of rows doubles (a horizontal step), or the number of columns doubles (a vertical step). The final step is a horizontal step, traversing all the odd-numbered rows of the image.

In various embodiments, quantized pixel differences can be used as context information. The differences L−TL, TL−T, T−TR, LL−L, TT−T can be computed and quantized (using a logarithmic scale), and used as the context. The contexts depend on the image traversal order.

Each frame can be split in 3 planes (Y, Cb, Cr). In the case of the normal YCbCr color space the Y plane is coded first followed by the Cb and Cr planes.

In various embodiments, an Adam7 interlaced image can be broken into seven sub-images, which involve replicating this 8×8 pattern across the full image. In each interlacing step, the number of pixels doubles. In each interlacing step, either the number of rows doubles (a horizontal step), or the number of columns doubles (a vertical step). The image pixels can be fed into the compression algorithm pipeline 400 in the predetermined order of the Adam7 or Adam∞ scan sequence.

For Adam7, the first step is simply presenting one pixel: the pixel in the top-left corner. In the second step, a second pixel is presented at a location four pixels to the right. The final step involves filling in the remaining horizontal row, and traversing all the odd-numbered rows of the image.

In various embodiments, the traditional Adam7 or Adam∞ interlacing mode/scheme is modified to enable an arbitrary pixel transmission order avoiding causality issues.

In various embodiments, an initial pixel 510 can be encoded or displayed at the upper left corner {0, 0} position of an 8×8 pixel block for Adam7, or of a 16×16 pixel block for Adam∞. Other pixel block sizes (e.g., 32×32, 64×64, 128×128, etc.) are also contemplated, where the pixel block size can depend on the size ($N_1$(rows)×$N_2$(columns)) of the image.

In a next operation, a second pixel 520 can be encoded or displayed at a {0, 4} position of the 8×8 pixel block or a {0, 8} position of a 16×16 pixel block.

In a following operation, two third pixels 530 can be sequentially encoded or displayed at the {4, 0} and {4, 4} positions of the 8×8 pixel block or the {8, 0} and {8, 8} position of the 16×16 pixel block.

At a subsequent operation, four fourth pixels 540 can be sequentially encoded or displayed at the {0, 2}, {0, 6}, {2, 0} and {6, 6} positions of the 8×8 pixel block or the {0, 4}, {0, 12}, {4, 0} and {12, 12} position of the 16×16 pixel block.

At a subsequent operation, eight fifth pixels 550 can be sequentially encoded or displayed at the {2, 0}, {2, 2}, {2, 4}, {2, 6}, {6, 0}, {6, 2}, {6, 4}, {6, 6} positions of the 8×8 pixel block, or at the {4, 0}, {4, 4}, {4, 8}, {4, 12}, {12, 0}, {12, 4}, {12, 8}, {12, 12} position of the 16×16 pixel block.

Figure 6A:
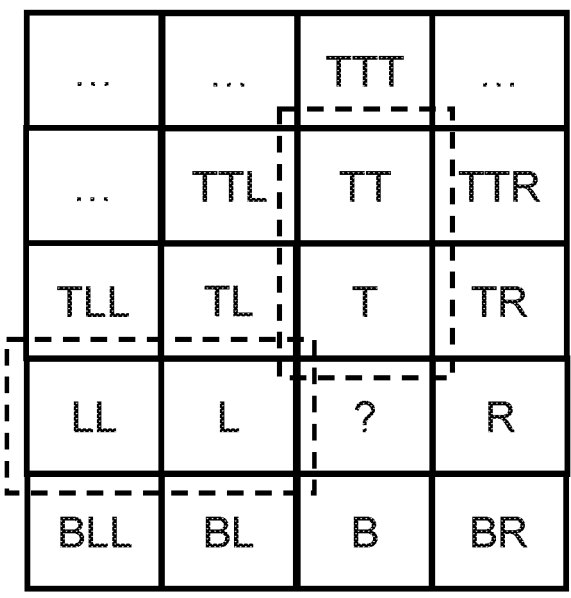
FIG. 6A shows a diagram of a context for predictive coding, according to aspects of the present disclosure.

At a subsequent operation, 16 sixth pixels 560 can be sequentially encoded or displayed at the {4, 0}, {4, 4}, {4, 8}, {4, 12}, {12, 0}, {12, 4}, {12, 8}, {12, 12} positions of the 8×8 pixel block FIG. 6A shows a diagram of a contexts for predictive coding, according to aspects of the present disclosure.

To predict pixel X for a color channel, c, given its previously decoded neighbors, where the neighbors are defined with respect to the current Zoom level. The quantized pixel differences can be used as context information, where the contexts depend on the image traversal order (interlace mode/scheme).

In various embodiments, the differences: L–TL or L–(TL+BL)/2, TL–T or T–(TL+TR)/2 (for horizontal step), T–TR or B–(BL+BR)/2 or R–(TR+BR)/2) (for vertical step), LL–L, TT–T, can be computed and quantized, for example, using a logarithmic scale. For each combination of these 6 properties (pixel color values at L, T, TL, TR, LL, and TT for the color channel), a different context can be defined. In total, 7563 different contexts (per color channel) can be used. Additional properties including, the prediction itself (the median of 3 values), and the pixel value(s) in the 0, 1, 2 or 3 previously traversed and encoded color channels, or the difference between the two adjacent pixels from the previous interlacing step (T–B in horizontal steps, L–R in vertical steps), and for the chroma channels the difference between the actual luma pixel value and the one predicted by the 'average' predictor.

A spatial dependency problem can occur concerning pixels at positions TT, T, LL, and L when the pixel in the position of "?" is to be predicted. To address this issue, the values at TT, T, LL, and L can be approximated using their neighbors from the previous zoom levels, where the previous Zoom levels are based on the interlacing mode/scheme.

$$TT = \frac{TTL + TTR}{2};$$

$$T = \frac{TL + TR}{2};$$

$$LL = \frac{TLL + BLL}{2};$$

$$L = \frac{TL + BL}{2}.$$

By modifying the predictor, the prediction of the pixels relies on the pixel values within the previous Zoom levels. To enable flexible pixel selection orders, the prediction of each transmitted pixel should not depend on any other pixels in the same or the lower Zoom level to make sure the transmitted pixels can be successfully decoded. The pixel traversal processes can be either vertical or horizontal. In the case of vertical traversal, each pixel is dependent on the previous vertical pixels, while the pixels in the right and left columns are from the previous Zoom levels which are assumed to be transmitted beforehand. For the process of horizontal traversal, each pixel is dependent on the previous horizontal pixels.

In various embodiments, content-aware compression can be enabled, where visually important regions of the image are synced with greater priority than lesser or unimportant regions.

Figure 6B:
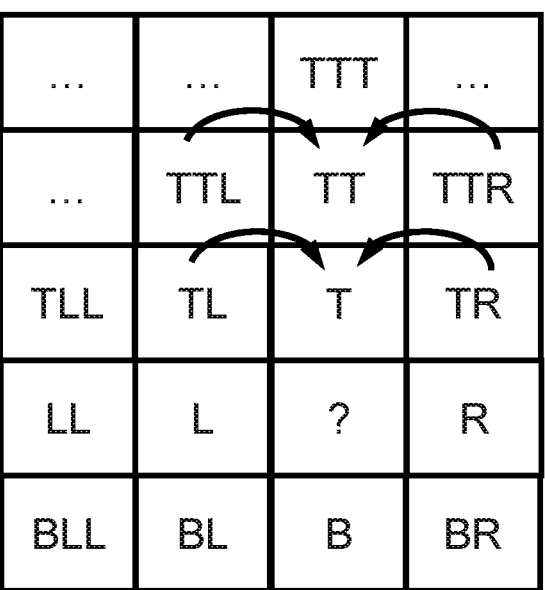
FIG. 6B shows a diagram of a predictive coding scheme, according to aspects of the present disclosure.

In various embodiments, a window or set of pixels of count, C, may be used for the context in a content-aware compression FIG. 6B shows a diagram of a predictive coding scheme, according to aspects of the present disclosure.

In various embodiments, the value for TT can be estimated from the values of TTL and TTR, where the TT value can correspond to the upper pixel "8" in the Adam∞ of FIG. 7, where the "8" represents a lower Zoom level.

$$TT = \frac{TTL + TTR}{2}.$$

In various embodiments, during the process of progressive syncing, the pixels can be selected according to the priority of the leaf nodes by some additional masks indicating the positions of the sent pixels, where the priority of the leaf nodes can be based on the entropy values of the associated pixels. The pixel masks of individual zoom levels can be used to indicate the positions of the transmitted pixels. The mask compression algorithm can be integrated to reduce the communication cost.

FIG. 7 shows a diagram of previously determined values for pixels in an example interlacing scheme, according to aspects of the present disclosure.

In various embodiments, the interlacing sequence can be based on an Adam∞ interlacing scheme, where a 16×16 block of pixels is traversed and fed into the MANIAC Tree.

The order of pixels used to predict the "?" pixel are circled with dashed boxes, where the values for the circled pixels may be further estimated by other available pixel values.

Figure 8:
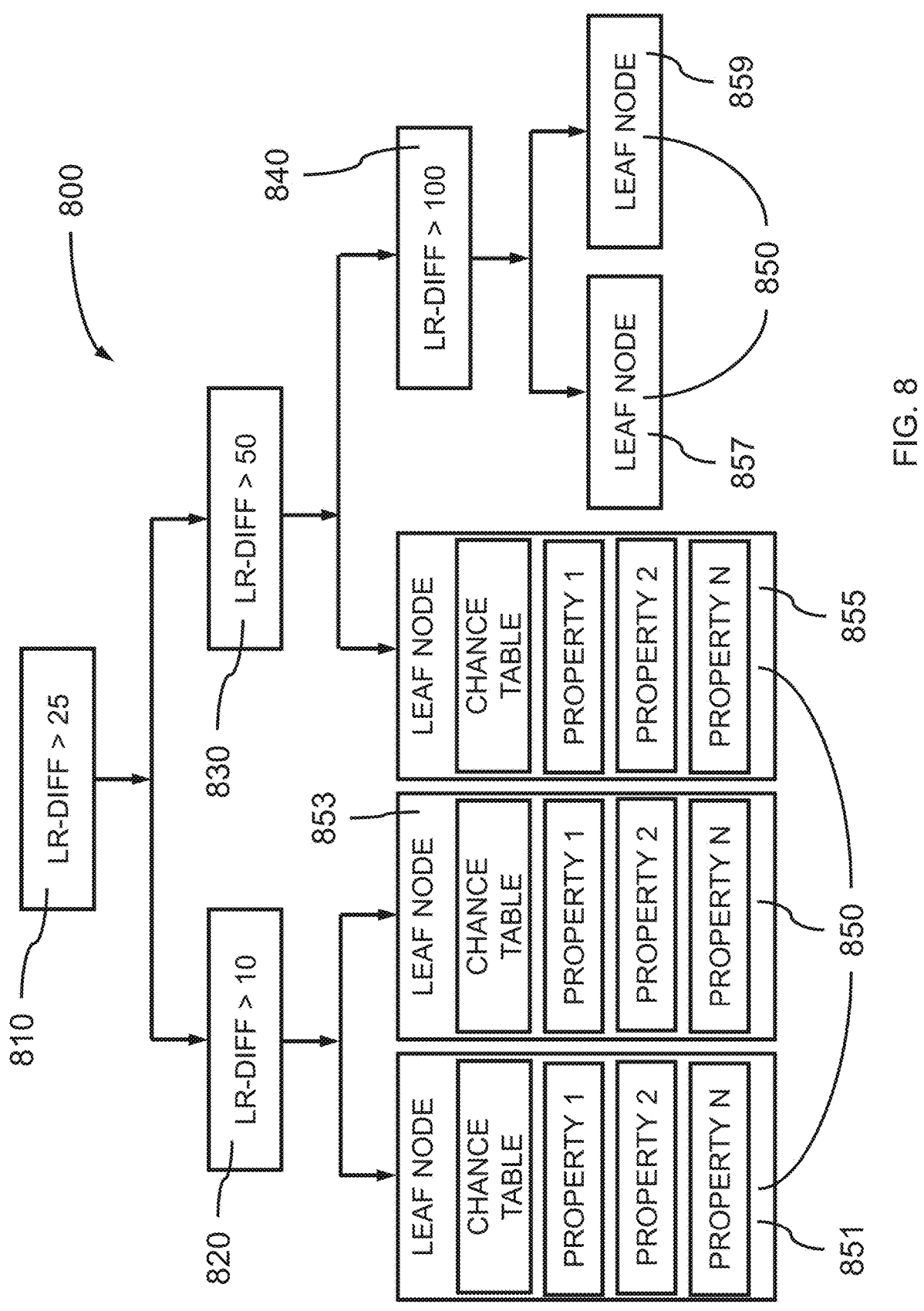
FIG. 8 shows a block/flow diagram of an example of MANIAC Tree generation method, according to aspects of the present disclosure.

FIG. 8 shows a block/flow diagram of an example of MANIAC Tree generation method, according to aspects of the present disclosure.

In various embodiments, there can be one MANIAC Tree per color channel, where the MANIAC Tree is a dynamic data structure that provides a context model. The MANIAC Tree can be grown during encoding. Each internal (non-leaf) node can include a test condition: an inequality comparing one of the context properties to a threshold value. The child nodes correspond to the two test branches. For each of the properties, each leaf node can maintain a running average of the property values encountered at that leaf node. Cost estimates can indicate which properties are most significant, where a cost estimate can be a function calculated as: $f(n, p_i)$, where n is the leaf node, and $p_i$ is the property value (e.g., i-th value in the property vector). $f(n, p_i)$=Entropy(residuals in n)−Entropy(residuals in two new modes if split by $p_i$). If the cost difference gets larger than a predetermined fixed threshold, the leaf node becomes a decision node testing the "best" property. The context tree can scale with the image: for large, complex images, more contexts would be used than for small, simple images.

In various embodiments, to construct a MANIAC Tree, the inner (or internal/non-leaf) nodes of a MANIAC tree contain a test of the form: property[k]>value; where if this test evaluates to true, then the left branch is taken, otherwise the right branch is taken. Eventually a leaf node is reached. The leaf nodes of a MANIAC tree contain a counter and a chance table. This chance table is used in the Near-zero symbol coding. The counter gets decremented each time the leaf node is reached. When it reaches zero, the tree 'grows' and the leaf node becomes an inner node (a decision node), where the tree is 'grown' as more and more symbols are encoded. The parent node's chance table gets duplicated and becomes the chance table of the two branch nodes. The number of contexts, that can be the number of leaf nodes in the MANIAC tree, can be image-dependent. The number of contexts is not static, but also grows during encoding, where there can be as many contexts as needed to represent the influence of local properties on the probability distributions.

In various embodiments, the MANIAC tree is not encoded immediately. Instead, a tree can be initialized with a single root node per color channel, and a 'rough preview' of the image using a few of the highest zoom levels can be encoded.

At operation 810, a property of a pixel can be tested based on the form: property[k]>value; where if this test evaluates to true and the pixel property is greater than the test threshold, then the left branch (as viewed from 810) to operation 830 is taken, otherwise the right branch to operation 820 is taken. Each of the inner nodes of a MANIAC tree can include a test criteria with a threshold value. The initial root node can have a predetermined test criteria value. After one or more inner nodes, a leaf node can be arrived at, where pixels having a property value between the prior test thresholds can be stored. Each leaf node 850 can be configured to store a predetermined number of pixels, which can be based on the size of the image and a number of test criteria. The leaf nodes of a MANIAC tree can contain a counter to track the number of pixels associated with each leaf node.

At operation 820, pixels having a property less that the test criteria threshold used at operation 810 can be tested based on a different test criteria threshold and assigned to one of two leaf nodes 850. For example, a pixel having a property with a value less-than or equal-to 10 can be assigned to leaf node 851, whereas a pixel with a property value greater than 10 can be assigned to leaf node 853.

At operation 830, pixels having a property greater that the test criteria threshold used at operation 810 can be tested based on a different test criteria threshold and assigned to a leaf node 850 or passed on to operation 840. For example, a pixel having a property with a value less-than or equal-to 50 but greater than 25 can be assigned to leaf node 855, whereas a pixel with a property value greater than 50 can undergo further testing at operation 840.

At operation 840, pixels having a property greater that the test criteria threshold used at operation 830 can be tested based on a different test criteria threshold and assigned to one of two leaf nodes 850. For example, a pixel having a property with a value less-than or equal-to 100 but greater than 50 can be assigned to leaf node 857, whereas a pixel with a property value greater than 100 can be assigned to leaf node 859.

The subset of pixels associated with each node depends on the pixel properties.

In various embodiments, a chance table can be the distribution of the residuals. Entropy encoding requires prior knowledge of the distribution of the data to encode. The entropy encoder in the pipeline can encode the residual values based on the distribution as specified in the chance table.

FIGS. 9A-9D shows an example of a progressive image scan, according to aspects of the present disclosure.

Figure 9A:
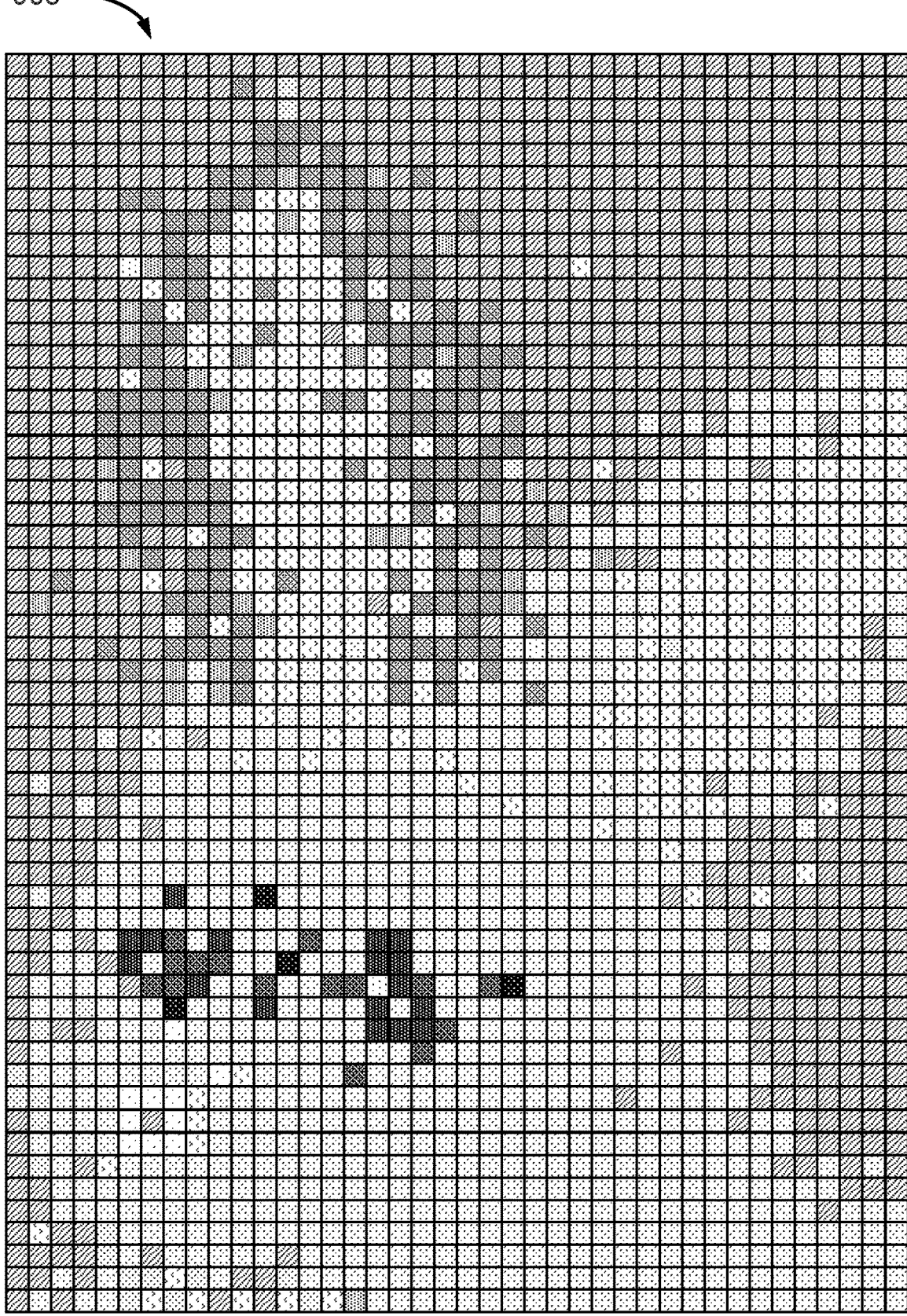
FIGS. 9A-9D shows an example of a progressive image scan, according to aspects of the present disclosure.

In various embodiments, an initially transmitted preview image 903 can include significant pixelation, rough edges and boundaries, and the resulting blurring of features, as shown in FIG. 9A. The user 110, who has partially received a transmitted image may see a full sized but degraded version of the original image 105.

Figure 9B:
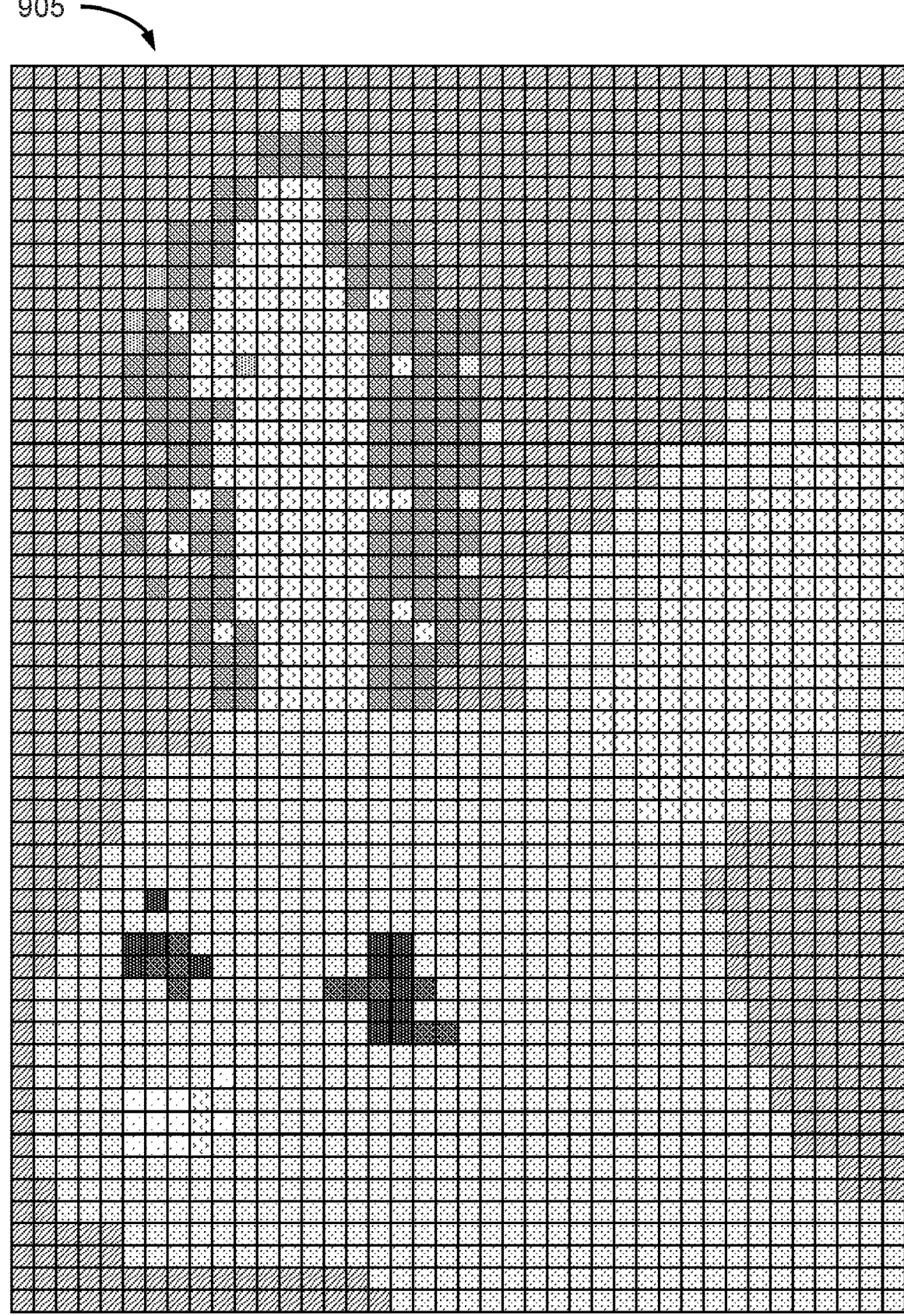

At a subsequent pass (e.g., Zoom level) pixels of the image may better represent the colors of the original image, and the pixelation may be reduced in regions prioritized based on entropy calculations, as shown in FIG. 9B. An improved image 905 may be temporarily presented to a user 110, as additional image data is communicated to the user.

Figure 9C:
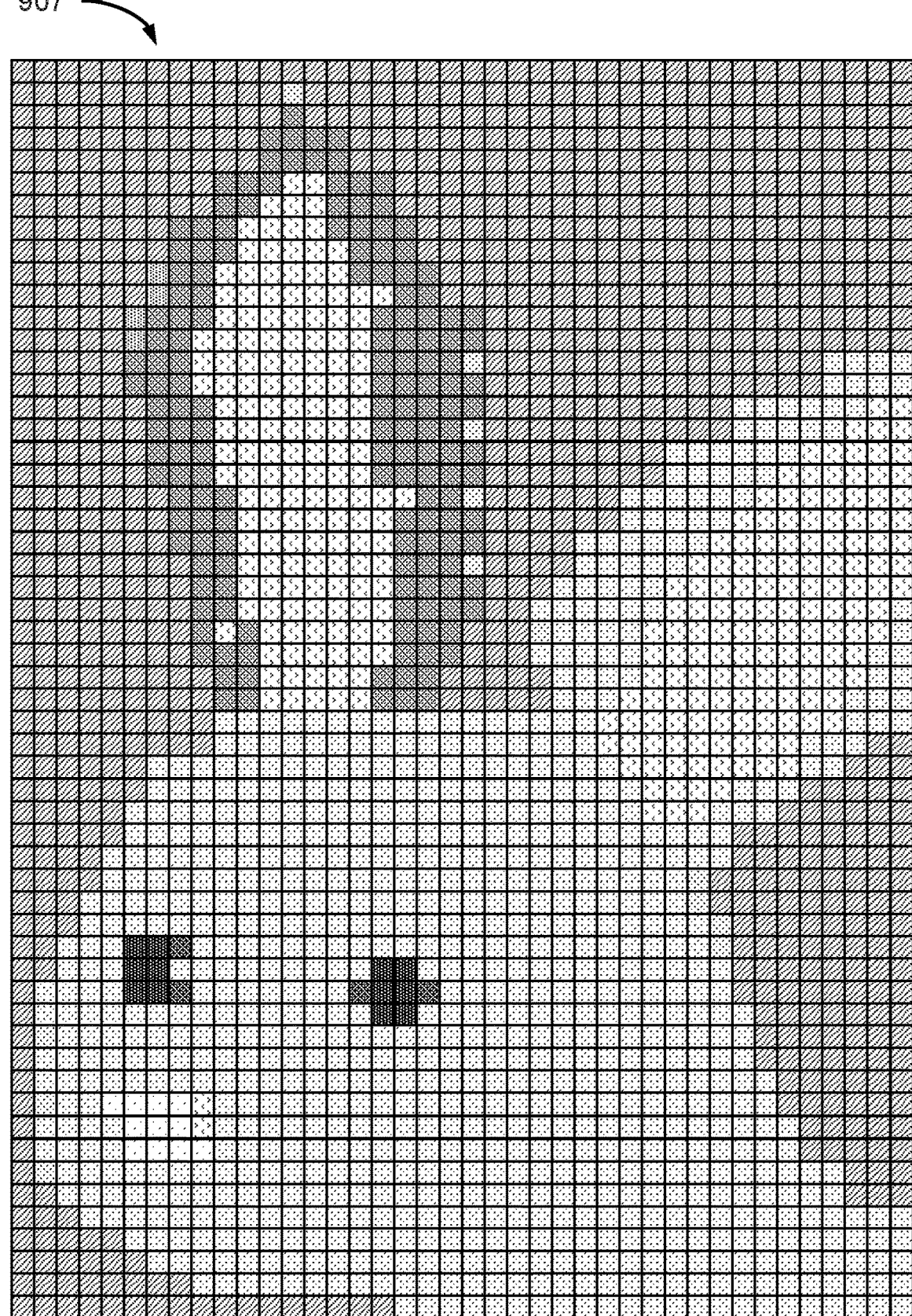

At a subsequent pass (e.g., Zoom level) the image may be further refined, where edges are sharpened and blurriness reduced in regions prioritized based on entropy calculations, as shown in FIG. 9C. A refined image 907 may be temporarily presented to a user 110, as additional image data is communicated to the user.

Figure 9D:
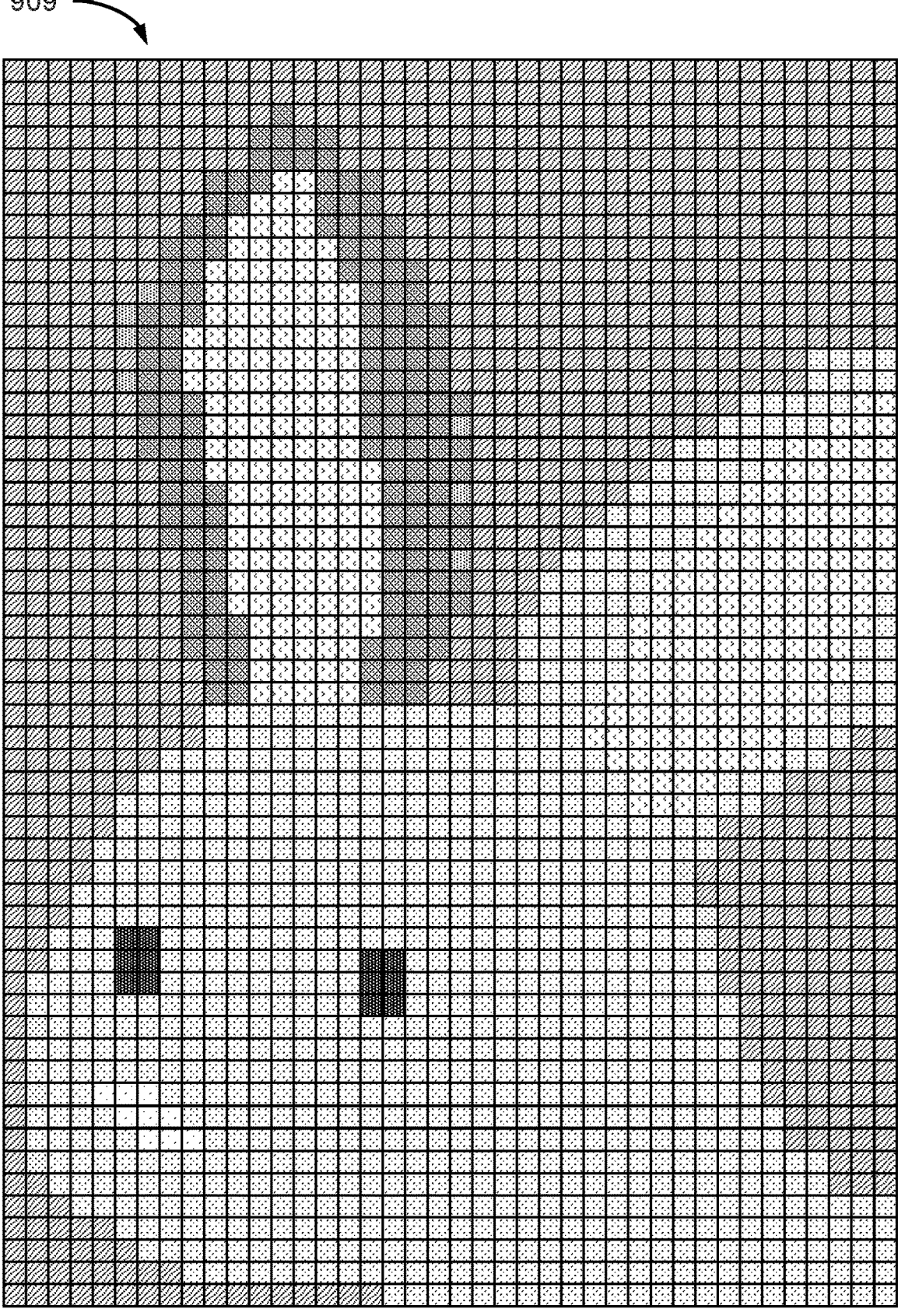

At another subsequent pass the refined image 909 may be further refined, where edges are further sharpened and blurriness further reduced in the regions prioritized based on entropy calculations, as shown in FIG. 9D. A reconstructed image 909 can present a decompressed image for display or printing. The reconstructed image 909 can be substantially closer to the original image than the initially transmitted preview image 903. The rate of improvement to the initially transmitted preview image 903 can be greater using the entropy prioritized pixel compression and transmission than a sequentially scanned image or an image compressed and transmitted using a fixed interlace sequence (e.g., pixel order).

Figure 10:
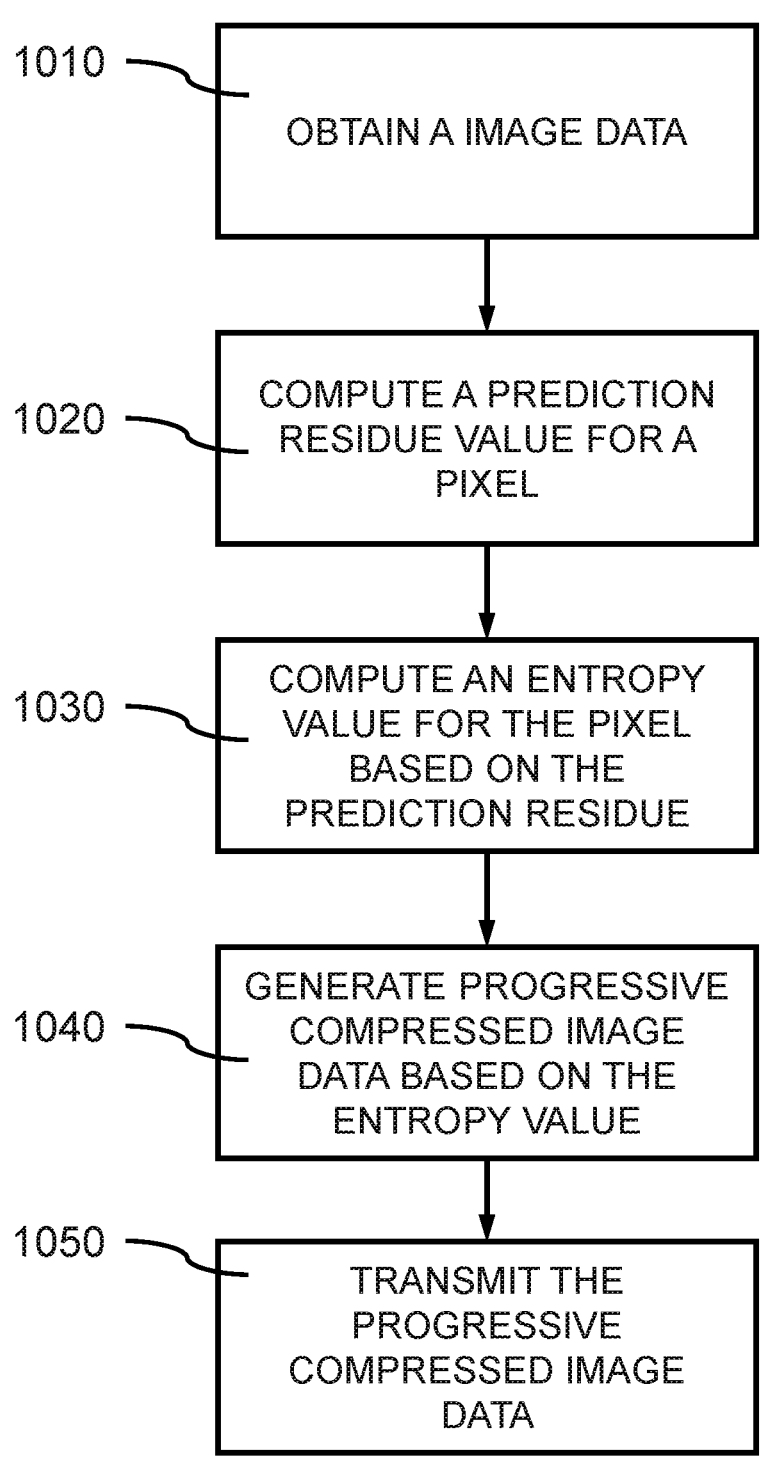
FIG. 10 shows a flow diagram of an example of a method for synchronized image editing, according to aspects of the present disclosure.

FIG. 10 shows a flow diagram of an example of a method for synchronized image editing, according to aspects of the present disclosure.

At operation 1010, an image can be obtained by a synchronized image editing system. The image can include image data including the pixel values forming the image and header data including metadata about the image and image file.

At operation 1020, a prediction residual value can be computed for each pixel of the image data using a prediction function. The prediction function can be based on context modeling, where a context model can be configured to generate a Meta-Adaptive Near-zero Integer Arithmetic Coding (MANIAC) Tree for the image data.

At operation 1030, an entropy value can be computed for the pixel based on the prediction residue, where the prediction residue value can be based on the context modeling. Computing a prediction residue value can include estimating context data for neighboring pixels, computing a prediction value for the pixel based on the context value, and comparing the image value to the prediction data to obtain the prediction residue value.

At operation 1040, progressive compressed image data can be generated based on the calculated entropy values, where pixels with higher entropy values can be selected for encoding. Computing the entropy value can include identifying a set of pixels associated with the pixel based on the context modeling, and applying an entropy function to the set of pixels to obtain the entropy value.

At operation 1050, the progressive compressed image data can be transmitted, where the data can be communicated over a data channel to a decoder. Interlacing can progressively reconstruct a compressed image.

Image Editing Synchronization

Figure 11:
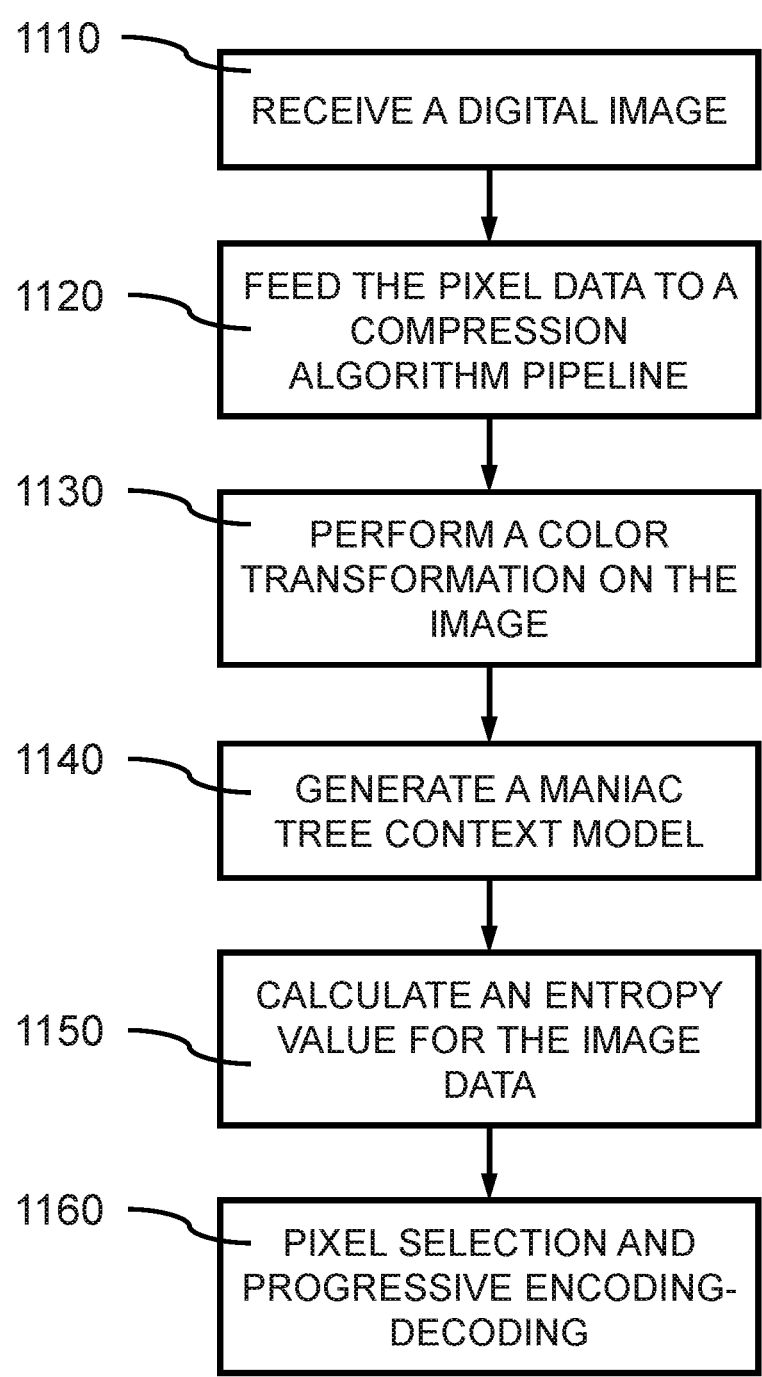
FIG. 11 shows a flow diagram of an example of a method for synchronized image editing, according to aspects of the present disclosure.

FIG. 11 shows a flow diagram of an example of a method for synchronized image editing, according to aspects of the present disclosure.

At operation 1110, a synchronized image editor system 300 can receive a digital image having a predetermined size and including image data, for example, color values for one or more color channels. The synchronized image editor system 300 may be on a user device or a remote server.

At operation 1120, the digital image may be fed into a compression algorithm pipeline to convert the image data to a compressed encoding. The image data may be transformed into progressive compressed image data through a lossless compression algorithm.

At operation 1130, the image data may undergo a color transformation that convert the image data from a first color space to a second color space. for example, an RGBA color space image can be transformed to YCoCgA. A color transformation can modify the pixel color data of the image data in a reversible way to make the image data compressible to a smaller size than the first color space data.

At operation 1140, a MANIAC Tree can be constructed using the image data in the second color space. The MANIAC Tree can be constructed using contexts based on properties (e.g., pixel color data), where the MANIAC Tree can sort the pixels into leaf nodes by testing the pixel property values against a threshold value.

At operation 1150, entropies can be calculated for each of the pixels associated with each of the leaf nodes of the MANIAC Tree, where the entropy values can be based on the residual values. The Meta-Adaptive Near-zero Integer Arithmetic Coding (MANIAC) tree including a plurality of leaf nodes, and entropy values can be calculated for the subset of pixels associated with each of the plurality of leaf nodes.

At operation 1160, pixels in a subset identified as having the highest entropy values can be prioritized and selected for encoding, where the pixels may be selected randomly from the subset associated with the leaf node having the highest average entropy. The randomly selected pixels can be progressively encoded. The encoded pixels can be progressively transmitted to a decoder to reconstruct an image.

In various embodiments, a discrete cosine transform (DCT) is not used to compress an image, where a discrete cosine transform (DCT) can help separate the image into parts (or spectral sub-bands) of differing importance with respect to the image's visual quality, where DCT transforms a signal or image from the spatial domain to the frequency domain. The basic operation of the DCT is as follows:

The input image is N by M pixels;

$f(i,j)$ is the intensity of the pixel in row i and column j;

The DCT input is an 8 by 8 array of integers. This array contains each pixel's gray scale level intensity). $F(u,v)$ is the DCT coefficient in row $k_1$ and column $k_2$ of the DCT matrix;

For most images, much of the signal energy lies at low frequencies; these appear in the upper left corner of the DCT.

Compression is achieved because the lower right values of the DCT represent higher frequencies, and are often small, i.e., small enough to be neglected with little visible distortion.

"Spatial frequency" refers to the number of pairs of bars imaged within a given distance on the retina. The unit employed to express spatial frequency is the number of cycles that fall within one degree of visual angle (each cycle is one dark and one light bar). One-third of a millimeter is a convenient unit of retinal distance because an image this size is said to subtend one degree of visual angle on the retina. The size or visual angle of the retinal image cast by some object depends on the distance of that object from the eye. The "fine detail" in an image is equivalent to "high spatial frequency."

Image Compression Computing Device

Figure 12:
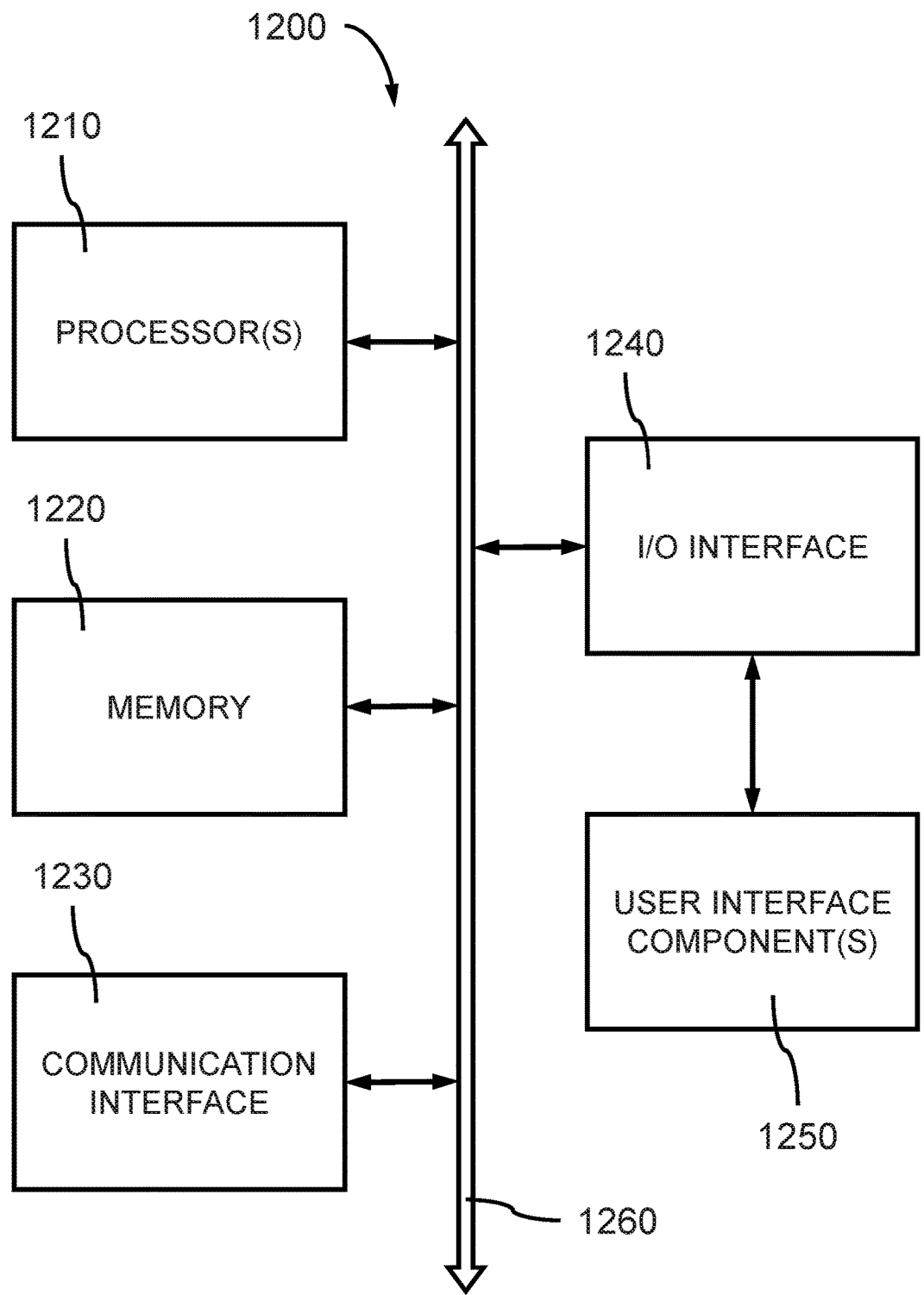
FIG. 12 shows an example of a computing device for synchronized image editing, according to aspects of the present disclosure.

FIG. 12 shows an example of a computing device for a description generation apparatus 120, according to aspects of the present disclosure.

In various embodiments, the computing device 1200 includes processor(s) 1210, memory subsystem 1220, communication interface 1230, I/O interface 1240, user interface component(s) 1250, and channel 1060.

In various embodiments, computing device 1200 is an example of, or includes aspects of description generation apparatus 120. In some embodiments, computing device 1200 includes one or more processors 1210 that can execute instructions stored in memory subsystem 1220 for identifying regions of an image and generating a description of the image based on the regions.

In various embodiments, computing device 1200 includes one or more processors 1210. In various embodiments, a processor 1210 can be an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor 1210 is configured to operate a memory array using a memory controller. In other cases, a memory controller is integrated into a processor. In some cases, a processor is configured to execute computer-readable instructions stored in a memory to perform various functions. In some embodiments, a processor 1210 includes special-purpose components for modem processing, baseband processing, digital signal processing, or transmission processing.

A processor 1210 may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor 1210, the functions may be stored in the form of instructions or code on a computer-readable medium.

In various embodiments, memory subsystem 1220 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor 1210 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1230 operates at a boundary between communicating entities (such as computing device 1200, one or more user devices, a cloud, and one or more databases) and channel 1260 (e.g., bus), and can record and process communications. In some cases, communication interface 1230 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1240 is controlled by an I/O controller to manage input and output signals for computing device 1200. In some cases, I/O interface 1240 manages peripherals not integrated into computing device 1200. In some cases, I/O interface 1240 represents a physical connection or a port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a user interface component, including, but not limited to, a modem, a keyboard, a mouse, a touchscreen, or a similar device. In some cases, the I/O controller is implemented as a component of a processor. In some cases, a user interacts with a device via I/O interface 1240 or via hardware components controlled by the I/O controller.

According to some aspects, user interface component(s) 1250 enable a user to interact with computing device 1200. In some cases, user interface component(s) 1250 include an audio device, such as an external speaker system, an external display device such as a display device 390 (e.g., screen), an input device (e.g., a remote-control device interfaced with a user interface directly or through the I/O controller), or a combination thereof. In some cases, user interface component(s) 1250 include a GUI.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining image data including pixels;

computing a prediction residue value for each pixel of the image data using a prediction function to generate a set of prediction residue values;

computing an entropy value for each pixel based on the set of prediction residue values using context modeling to generate a set of entropy values;

and generating progressive compressed image data for the image data based on the set of entropy values, wherein the progressive compressed image data is organized into first partial progressive compressed image data corresponding to the pixels having entropy values higher than a threshold within the set of entropy values and a second partial progressive compressed image data corresponding to the pixels having entropy values lower than the threshold within the set of entropy values.

2. The method of claim 1, wherein computing a prediction residue value comprises:
estimating context data for neighboring pixels of a pixel among the pixels;
computing a prediction value for the pixel based on the context data; and
comparing an image value of the pixel to the prediction value to obtain the prediction residue value.

3. The method of claim 1, wherein computing the entropy value comprises:
identifying a set of pixels associated with the pixel based on the context modeling; and
applying an entropy function to the set of pixels to obtain the entropy value.

4. The method of claim 3, wherein:
the context modeling comprises a Meta-Adaptive Near-zero Integer Arithmetic Coding (MANIAC) tree; and
the set of pixels corresponds to a node of the MANIAC tree.

5. The method of claim 3, further comprising:
identifying a set of properties for the pixel based on a set of neighboring pixels, wherein the context modeling is based on the set of properties.

6. The method of claim 1, wherein generating the progressive compressed image data comprises:
sampling the pixel based on the entropy value; and
compressing a portion of the image data corresponding to the pixel to obtain the first partial progressive compressed image data.

7. The method of claim 6, wherein generating the progressive compressed image data comprises:
sampling a subsequent pixel based on a subsequent entropy value; and
compressing a subsequent portion of the image data corresponding to the subsequent pixel to obtain the second partial progressive compressed image data.

8. The method of claim 7, further comprising:
transmitting the first partial progressive compressed image data; and
transmitting the second partial progressive compressed image data after the first partial progressive compressed image data.

9. The method of claim 1, further comprising:
generating a Meta-Adaptive Near-zero Integer Arithmetic Coding (MANIAC) tree including a plurality of leaf nodes;
assigning a subset of a plurality pixels to each of the plurality of leaf nodes; and
calculating entropy values for the subset of the pixels associated with each of the plurality of leaf nodes.

10. The method of claim 9, further comprising:
identifying a leaf node having a maximum entropy value for the subset of pixels associated with the identified leaf node;
encoding a predetermined portion of the subset of the pixels associated with the identified leaf node; and
transmitting the encoded portion of the pixels to a decoder.

11. The method of claim 1, further comprising:
synchronizing an image display in a remote image editing application based on the progressive compressed image data.

12. A non-transitory computer readable medium storing executable instructions, which when executed by a processing device, cause the processing device to perform operations comprising:
obtaining image data including pixels;
computing a prediction residue value for each pixel of the image data using a prediction function to generate a set of prediction residue values;
computing an entropy value for each pixel based on the set of prediction residue values using context modeling to generate a set of entropy values;
and generating progressive compressed image data for the image data based on the set of entropy values wherein the progressive compressed image data is organized into first partial progressive compressed image data corresponding to the pixels having entropy values higher than a threshold within the set of entropy values and a second partial progressive compressed image data corresponding to the pixels having entropy values lower than the threshold within the set of entropy values.

13. The computer readable medium of claim 12, wherein computing a prediction residue value comprises:
estimating context data for neighboring pixels of a pixel among the pixels;
computing a prediction value for the pixel based on the context data; and
comparing an image value of the pixel to the prediction value to obtain the prediction residue value.

14. The computer readable medium of claim 12, wherein computing the entropy value comprises:
identifying a set of pixels associated with the pixel based on the context modeling; and
applying an entropy function to the set of pixels to obtain the entropy value.

15. The computer readable medium of claim 14, wherein:
the context modeling comprises a Meta-Adaptive Near-zero Integer Arithmetic Coding (MANIAC) tree; and
the set of pixels corresponds to a node of the MANIAC tree.

16. A method comprising:
obtaining image data including pixels for an image at a first device;
computing an entropy value for each pixel using a prediction function to generate a set of prediction residue values;
computing an entropy value for each pixel based on the set of prediction residue values using context modeling to generate a set of entropy values;
generating progressive compressed image data for the image data based on the set of entropy values; and
transmitting first partial progressive compressed image data of the progressive compressed image data corresponding to the pixels having entropy values higher than a threshold within the set of entropy values to a second device prior to transmitting second partial progressive compressed image data of the progressive compressed image data corresponding to the pixels having entropy values lower than the threshold within the set of entropy values to the second device.

17. The method of claim 16, further comprising:
receiving an image edit input at the first device, wherein the progressive compressed image data is transmitted in response to the image edit input.

18. The method of claim 16, wherein:

the image is displayed in real time at a plurality of successively increasing detail levels at the second device based on the progressive compressed image data.

19. The method of claim 16, wherein:

the progressive compressed image data is transmitted to the second device via a data stream including the first partial progressive compressed image data and the second partial progressive compressed image data.

20. The method of claim 16, further comprising:

synchronizing the image at the first device and the second device based on the progressive compressed image data.

* * * * *